US 9,486,855 B2

(12) United States Patent
Suzuki et al.

(10) Patent No.: US 9,486,855 B2
(45) Date of Patent: Nov. 8, 2016

(54) METHOD OF MANUFACTURING CALIPER BODY OF FLOATING-TYPE DISK BRAKE AND THE CALIPER BODY

(71) Applicant: HITACHI AUTOMOTIVE SYSTEMS, LTD., Hitachinaka-Shi, Ibaraki (JP)

(72) Inventors: Shinji Suzuki, Minami Alps (JP); Kimiyasu Kono, Chuo (JP); Yasuhisa Omata, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/563,890

(22) Filed: Dec. 8, 2014

(65) Prior Publication Data
US 2015/0089790 A1 Apr. 2, 2015

Related U.S. Application Data

(62) Division of application No. 13/243,390, filed on Sep. 23, 2011, now Pat. No. 8,931,600.

(30) Foreign Application Priority Data

Oct. 7, 2010 (JP) .................................. 2010-227895

(51) Int. Cl.
*B22D 37/00* (2006.01)
*B22D 25/02* (2006.01)
(Continued)

(52) U.S. Cl.
CPC ............... *B22C 9/22* (2013.01); *B22D 23/006* (2013.01); *B22D 25/02* (2013.01);
(Continued)

(58) Field of Classification Search
CPC ...... B22D 23/02; B22D 25/02; B22D 25/00; B22D 21/007; B22D 17/00; F16D 2250/0007; F16D 2250/0092; F16D 2250/0076; F16D 2055/0016; F16D 55/226; Y10S 29/005; Y10T 29/49988; Y10T 29/49989; Y10T 29/4998
See application file for complete search history.

(56) References Cited

U.S. PATENT DOCUMENTS 5,518,062 A * 5/1996 Kobayashi ................ B22C 9/10
164/137
6,467,528 B1 * 10/2002 Kamm ............... B22D 17/2015
164/113

(Continued)

FOREIGN PATENT DOCUMENTS

DE    EP 0846884 A2 * 6/1998 ............. B22D 19/00
GB    2127117 A * 4/1984 ............ F16D 55/226

(Continued)

OTHER PUBLICATIONS

Office Action Issued in Japanese Patent Appl No. 2010-227895 on September 2, 2014 With Corresponding English Language Translation of Thereof.

(Continued)

*Primary Examiner* — Essama Omgba
(74) *Attorney, Agent, or Firm* — Nixon & Vanderhye P.C.

(57) ABSTRACT

A caliper body of a floating-type disk brake includes a cylinder-part constituent part including a cylinder bore into which a piston pressing brake pads against a disk rotor is disposed, a bridge part extending from the cylinder-part constituent part and including a through-hole, and a claw-part constituent part formed on a leading end side of the bridge part and disposed so as to be opposite to the cylinder-part constituent part. In a method of manufacturing the caliper body of the floating-type disk brake, a mold in which sprues are provided in at least two places spaced apart from each other in a disk rotor circumferential direction on a region corresponding to the claw-part constituent part is prepared. Molten metal is poured from the sprues of the at least two places of the mold, and starts to solidify from a side of the cylinder-part constituent part.

7 Claims, 13 Drawing Sheets

(51) Int. Cl.
*B22D 23/00* (2006.01)
*F16D 55/00* (2006.01)
*B22C 9/22* (2006.01)
*F16D 65/00* (2006.01)

(52) U.S. Cl.
CPC .... *F16D 65/0068* (2013.01); *F16D 2055/002* (2013.01); *F16D 2055/0016* (2013.01); *F16D 2250/0007* (2013.01); *F16D 2250/0076* (2013.01); *Y10T 29/49988* (2015.01); *Y10T 29/49989* (2015.01)

(56) References Cited

U.S. PATENT DOCUMENTS

| | | | |
|---|---|---|---|
| 6,745,819 B2* | 6/2004 | Kamm | B22D 17/12 164/113 |
| 6,913,062 B2* | 7/2005 | Kamm | B22D 17/12 164/113 |
| 6,926,123 B2* | 8/2005 | Goebel | B22C 9/22 164/137 |
| 7,108,109 B1 | 9/2006 | Wilkings et al. | |
| 7,168,529 B2* | 1/2007 | Morais | B22D 31/002 188/72.4 |
| 7,232,015 B1* | 6/2007 | Umehara | F16D 55/226 148/538 |
| 7,318,467 B2 | 1/2008 | Umehara et al. | |
| 8,132,612 B2 | 3/2012 | Morais et al. | |
| 8,931,600 B2* | 1/2015 | Suzuki | B22D 23/006 164/133 |
| 8,997,945 B1* | 4/2015 | Morais | F16D 55/226 188/71.1 |
| 2003/0037901 A1* | 2/2003 | Kamm | B22D 17/12 164/113 |
| 2004/0060781 A1* | 4/2004 | Goebel | B22C 9/22 188/73.31 |
| 2004/0216858 A1* | 11/2004 | Kamm | B22D 17/12 164/113 |
| 2007/0209773 A1* | 9/2007 | Umehara | F16D 55/226 164/47 |
| 2012/0085600 A1* | 4/2012 | Suzuki | B22D 23/006 188/73.31 |
| 2014/0360633 A1* | 12/2014 | Sato | B22C 9/24 148/549 |
| 2015/0089790 A1* | 4/2015 | Suzuki | B22D 23/006 29/527.6 |
| 2016/0158830 A1* | 6/2016 | Morais | F16D 65/0068 188/73.31 |
| 2016/0184883 A1* | 6/2016 | Arai | B22C 9/101 188/73.31 |
| 2016/0199904 A1* | 7/2016 | Arai | B22C 9/10 188/73.31 |

FOREIGN PATENT DOCUMENTS

| | | |
|---|---|---|
| JP | 2002333040 A * | 11/2002 |
| JP | A 2004-278730 | 10/2004 |
| JP | A 2008-309181 | 12/2008 |
| JP | 2009030802 A * | 2/2009 |
| KR | 2006044038 A * | 5/2006 |

OTHER PUBLICATIONS

Keshavaram, B. N., "Aluminum Alloys for Automotive disc Brake Calipers", SAE International Congress and Exposition, (Mar. 1-4, 1999), 19 pages.

* cited by examiner

METHOD OF MANUFACTURING CALIPER BODY OF FLOATING-TYPE DISK BRAKE AND THE CALIPER BODY

This application is a Divisional of U.S. patent application Ser. No. 13/243,390, filed Sep. 23, 2011, which issued as U.S. Pat. No. 8,931,600 on Jan. 13, 2015, and which claims priority to Japanese Patent Application No. 2010-227895 filed Oct. 7, 2010, the contents of which are incorporated herein by reference.

BACKGROUND OF THE INVENTION

1. Field of the Invention

The present invention relates to a method of manufacturing a caliper body of a floating-type disk brake and the caliper body.

Priority is claimed on Japanese Patent Application No. 2010-227895 filed on Oct. 7, 2010, the content of which is incorporated herein by reference.

2. Description of Related Art

A caliper body of a floating-type disk brake is cast using the bottom part side of a cylinder part as a sprue. As a result, a cut surface of the sprue is formed at a bottom part of the cylinder part (for example, see FIG. 2 of SAE TECHNICAL PAPER SERIES 1999-01-0346, (US) SAE international, Mar. 1 to 4, 1999).

As described above, when the caliper body is cast using the bottom part side of the cylinder part as the sprue, manufacturing efficiency may become low.

SUMMARY OF THE INVENTION

An objective of the present invention is to provide a method of manufacturing a caliper body of a floating-type disk brake and the caliper body, capable of improving manufacturing efficiency.

According to a first aspect of the present invention, a method of manufacturing a caliper body of a floating-type disk brake, in which the caliper body includes a cylinder part having a cylinder bore into which a piston pressing brake pads against a disk rotor is disposed, a bridge part extending from the cylinder part and including a through-hole, and a claw part formed on a leading end side of the bridge part and disposed so as to be opposite to the cylinder part. The method includes: preparing a mold in which sprues are provided in at least two places spaced apart from each other in a disk rotor circumferential direction on a region corresponding to the claw part; and pouring molten metal from the sprues in the at least two places of the mold, the molten metal starting to solidify from a side of the cylinder part.

After the pouring of the molten metal is completed, the mold may be disposed so that a region corresponding to the cylinder part is located at a lower side in a vertical direction and a region corresponding to the claw part is located at an upper side in the vertical direction.

The mold may be configured so that the sprues in the at least two places are formed at positions with no interference from the through-hole in a disk rotor axial direction.

The mold may include a riser storage part formed at a position corresponding to a region forming the through-hole in a disk rotor axial direction between the sprues in the at least two places of the region corresponding to the claw part.

The mold may be configured so that a region forming the through-hole is formed at two places spaced apart from each other in the disk rotor circumferential direction on a region corresponding to the bridge part, that the sprues are provided at three opposite and middle places spaced apart from one another in the disk rotor circumferential direction on a region corresponding to the claw part, and that two riser storage parts are formed at positions corresponding to the region forming the through-hole in a direction along an axis of the cylinder part between the respective sprues of the three places.

The mold may be configured so that the bridge part has the through-hole forming part where the through-hole is formed, and the through-hole forming part is formed so that a length in the disk rotor circumferential direction on the side of a region corresponding to the claw part is greater than a length in the disk rotor circumferential direction on the side of a region corresponding to the cylinder part.

The method of manufacturing a caliper body of a floating-type disk brake may further include: casting the cylinder part whose bottom part has an opening; inserting a cutting tool from the opening after casting to machine the cylinder bore of the cylinder part; and closing the opening using a cover member after the machining.

According to a second aspect of the present invention, a caliper body of a floating-type disk brake includes a cylinder part having a cylinder bore into which a piston pressing brake pads against a disk rotor is disposed, a bridge part extending from the cylinder part and including a through-hole, and a claw part formed on a leading end side of the bridge part and disposed so as to be opposite to the cylinder part. The cylinder part, the bridge part, and the claw part are integrally cast, and cut surfaces of sprues are located in at least two places of an end face in a disk rotor axial direction on both sides of a disk rotor circumferential direction of the claw part.

The claw part may be located between the cut surfaces of the sprues in the at least two places. The claw part may be formed with a riser that is located at a position corresponding to the through-hole in the disk rotor axial direction.

The through-hole may be formed at two places spaced apart from each other in the disk rotor circumferential direction on the bridge part, the cut surfaces of the sprues may be located at three opposite and middle places spaced apart from one another in the disk rotor circumferential direction of the claw part, and two cut surfaces of a riser may be formed between the respective cut surfaces of the sprues at the three places at positions corresponding to the through-holes in the disk rotor axial direction.

The through-hole may be formed so that a length in the disk rotor circumferential direction on a side of the claw part is greater than a length in the disk rotor circumferential direction on a side of the cylinder part.

The cylinder part may be cast with an opening formed in a bottom part thereof, and the opening may be closed by a cover member.

According to a third aspect of the present invention, a caliper body of a floating-type disk brake includes a cylinder part having a cylinder bore into which a piston pressing brake pads against a disk rotor is disposed, a bridge part extending from the cylinder part, and a claw part formed on a leading end side of the bridge part and disposed so as to be opposite to the cylinder part. The cylinder part, the bridge part, and the claw part are integrally cast, a cut surface of a sprue may be located on an end face in a disk rotor axial direction of the claw part, and the cut surface is configured so that a total length in a disk rotor circumferential direction is greater than a length in a disk rotor radial direction.

The cut surfaces may be located at two places of the end face in the disk rotor axial direction on both sides in the disk rotor circumferential direction of the claw part.

The bridge part may be formed with a through-hole. The claw part may be located between the cut surfaces of the sprues in the at least two places. A cut surface of a riser may be formed at a position corresponding to the through-hole in the disk rotor axial direction.

The through-hole may be formed at two places spaced apart from each other in the disk rotor circumferential direction on the bridge part, the cut surfaces of the sprues are located at three opposite and middle places spaced apart from one another in the disk rotor circumferential direction of the claw part, and the two cut surface of the riser are formed between the respective cut surfaces of the sprues of the three places at the positions corresponding to the through-holes in the disk rotor axial direction.

The through-hole may be formed so that the length in the disk rotor circumferential direction on the side of the claw part is greater than the length in the disk rotor circumferential direction on the side of the cylinder part.

The cylinder part may be cast with an opening formed in a bottom part thereof, and the opening may be closed by a cover member.

According to the aspects of the present invention, it is possible to improve efficiency of manufacturing the floating-type disk brake

DETAILED DESCRIPTION OF THE INVENTION

First Embodiment

A first embodiment of the present invention will be described with reference to FIGS. 1 to 4.

Figure 1:
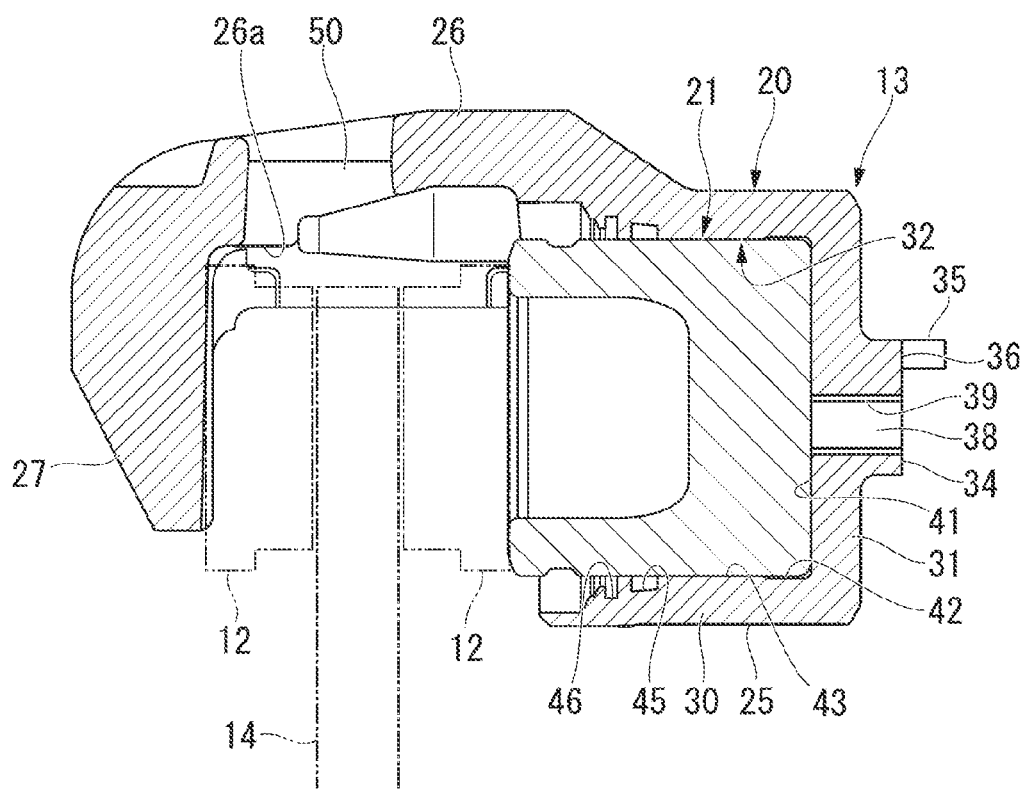
FIG. 1 is a side cross-sectional view showing a caliper body, a piston, etc. according to a first embodiment of the present invention.

FIG. 1 shows a floating-type disk brake according to a first embodiment of the present invention. This disk brake includes a pair of brake pads 12 and a caliper 13. The pair of brake pads 12 and the caliper 13 are supported by a carrier (not shown) fixed to a non-rotation part of a vehicle.

The pair of brake pads 12 are supported by the carrier (not shown) so as to be able to slide in an axial direction of a disk rotor 14 (a left and right direction in FIG. 1, which corresponds to an axial direction of a cylinder part 25, which will be described below) in a state where the brake pads 12 are disposed on both surfaces of the disk rotor 14 rotating together with a wheel so as to be opposite to each other. Hereinafter, a radial direction of the disk rotor 14 (an up and down direction in FIG. 1) is referred to as a disk rotor radial direction, and the axial direction of the disk rotor 14 and the axial direction of the cylinder part 25 are generically referred to as a disk rotor axial direction. A circumferential direction of the disk rotor 14 (a direction perpendicular to the sheet surface in FIG. 1) is referred to as a disk rotor circumferential direction.

The caliper 13 is supported by the carrier (not shown) so as to be able to slide in the disk rotor axial direction in a state that the caliper 13 astride an outer diameter side of the disk rotor 14. The caliper 13 presses the brake pads 12 against the disk rotor 14, thereby applying a frictional resistance to the disk rotor 14.

The caliper 13 includes a caliper body 20, which is supported on the carrier (not shown) by a sliding pin (not shown) so as to be able to slide in the disk rotor axial direction, and a piston 21, which is supported on the caliper body 20 so as to be able to slide in the disk rotor axial direction.

The caliper body 20 includes the cylinder part 25, a bridge part 26, and a claw part 27. The caliper body 20 is supported on the carrier (not shown) in a state where the cylinder part 25 is disposed on one side in the axial direction of the disk rotor 14, where the claw part 27 is disposed on the other side in the axial direction of the disk rotor 14, and where bridge part 26 connecting the claw part 27 and the cylinder part 25 with each other astride the outer diameter side of the disk rotor 14. Thus, the caliper 13 including the caliper body 20 is configured as a so-called fist-type caliper.

In the first embodiment, to reduce the weight of the caliper body 20, the cylinder part 25, the bridge part 26, and the claw part 27 are integrally cast of an aluminum alloy. That is, the caliper body 20 can be called a so-called monoblock caliper body. However, the caliper body 20 is not limited to the aluminum alloy, and thus it may be formed of other lightweight alloys or cast irons.

The cylinder part 25 is configured of a bottomed cylinder having a cylindrical part 30 disposed along the disk rotor axial direction and a bottom part 31 closing the cylindrical part 30 on the opposite side of the claw part 27. The cylinder part 25 is provided with a cylinder bore 32 on the inside thereof. The cylinder bore 32 is formed along the disk rotor axial direction. The piston 21 is disposed in the cylinder bore 32.

The bottom part 31 of the cylinder part 25 is provided with a pedestal part 34. The pedestal part 34 is formed at an intermediate position of the disk rotor circumferential and the radial direction in the bottom part 31 so as to protrude toward the opposite side of the claw part 27 in the disk rotor axial direction. Alternatively, the pedestal part 34 may be disposed at an arbitrary position as long as the arbitrary position is the intermediate position of the disk rotor circumferential and radial directions in the bottom part 31, except for an edge of the disk rotor circumferential and radial directions.

The pedestal part 34 is provided with a pair of locking protrusion parts 35 (only one of which is shown in the FIG. 1 because the FIG. 1 shows a cross-section of the caliper body 20), which protrude from both ends of the disk rotor circumferential direction of the outer side (the upper side in FIG. 1) of the disk rotor radial direction thereof toward the opposite side of the claw part 27 in the disk rotor axial direction. As a result, a recess part 36 is formed between the pair of locking protrusion parts 35 in the disk rotor radial direction. The recess part 36 is formed by machining after the caliper body 20 is cast. However, the recess part 36 may be formed when cast as indicated by a dotted line in FIG. 2.

The pedestal part 34 is provided with a bottom hole 38 in the disk rotor axial direction at an approximately central position thereof closer to the inner side (the lower side in FIG. 1) of the disk rotor radial direction than the locking protrusion parts 35. The bottom hole 38 passes through the pedestal part 34 and the bottom part 31, and is provided with female threads 39 in an inner circumferential surface thereof.

A mouthpiece of a brake pipe (not shown) is disposed in the recess part 36. In this state, a union bolt as the mouthpiece is screwed into the female threads 39 of the bottom hole 38. As a result, the mouthpiece of the brake pipe is mounted on the pedestal part 34 in a state where rotation is prevented by the pair of locking protrusion parts 35. In this state, the brake pipe communicates with a space between the cylinder part 25 and the piston 21.

When brake fluid is introduced into the space (pressure chamber) between the cylinder part 25 and the piston 21 through the brake pipe, the piston 21 slides toward the claw part 27, and the pair of brake pads 12 are pressed against the disk rotor 14 by the piston 21 and the claw part 27, thereby putting a brake on the rotation of the disk rotor 14. At this time, the pair of brake pads 12 and the caliper 13 slide relative to the carrier (not shown) in the disk rotor axial direction.

The cylinder bore 32 includes a bottom surface 41 that is located on the innermost side and is perpendicular to an axial direction of the cylinder bore, a large inner diameter part 42 that abuts on the bottom surface 41 and is directed along the axial direction of the cylinder bore 32, and a slide inner diameter part 43 that abuts on the large inner diameter part 42 on the opposite side of the bottom surface 41 and is directed along the axial direction of the cylinder bore 32. The slide inner diameter part 43 has a smaller inner diameter than the large inner diameter part 42. The cylinder bore 32 slidably holds the piston 21 in the slide inner diameter part 43. The slide inner diameter part 43 is provided with a seal groove 45 that fixes a piston seal (not shown) which seals a space between the slide inner diameter part 43 and the piston 21, and a boot groove 46 that fixes one end side of a boot (not shown) disposed between the slide inner diameter part 43 and the piston 21.

Here, the slide inner diameter part 43, the seal groove 45, and the boot groove 46 of the cylinder bore 32 are formed by machining. Meanwhile, the large inner diameter part 42 and the bottom surface 41 are formed by casting, however, the large inner diameter part 42 and the bottom surface 41 may be formed by machining. Further, a machining tool for forming the cylinder bore 32 is inserted between the claw part 27 and the cylinder part 25 to conduct machining.

The bridge part 26 extends from the outer side of the cylindrical part 30 of the cylinder part 25 toward the opposite side of the bottom part 31 along the disk rotor axial direction. The bridge part 26 is provided with a through-hole 50 at an intermediate position of the disk rotor axial direction thereof, wherein the through-hole 50 passes through the bridge part 26 in the disk rotor radial direction. The through-hole 50 is provided for the purpose of observing a wear state of the brake pads 12, discharging frictional heat in braking, or discharging wear debris of the brake pads 12.

The claw part 27 is formed at a front end of the bridge part 26 in the extending direction. The claw part 27 extends from the front end of the bridge part 26 toward the inside of the disk rotor radial direction, and is disposed so as to be opposite to the cylinder part 25. The claw part 27 is disposed so as to be opposite to the cylinder bore 32 while surrounding a central axis of the cylinder bore 32 to supplement strength of an aluminum alloy or a lightweight alloy other than the aluminum alloy. The claw part 27 has no recess into which the tool for machining the cylinder bore 32 is inserted.

Figure 2:
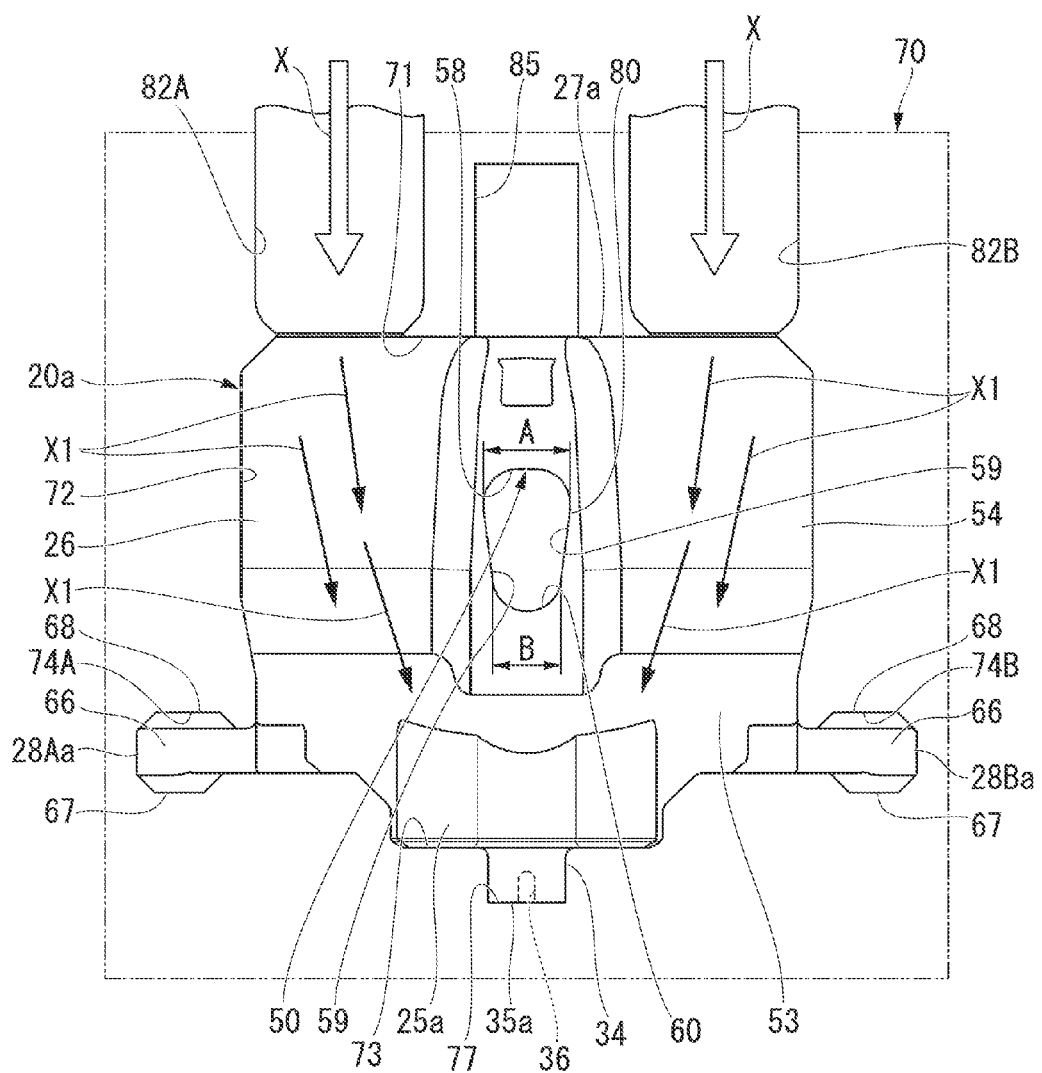
FIG. 2 is a front view showing a casting material of the caliper body and a mold according to the first embodiment of the present invention.
Figure 3:
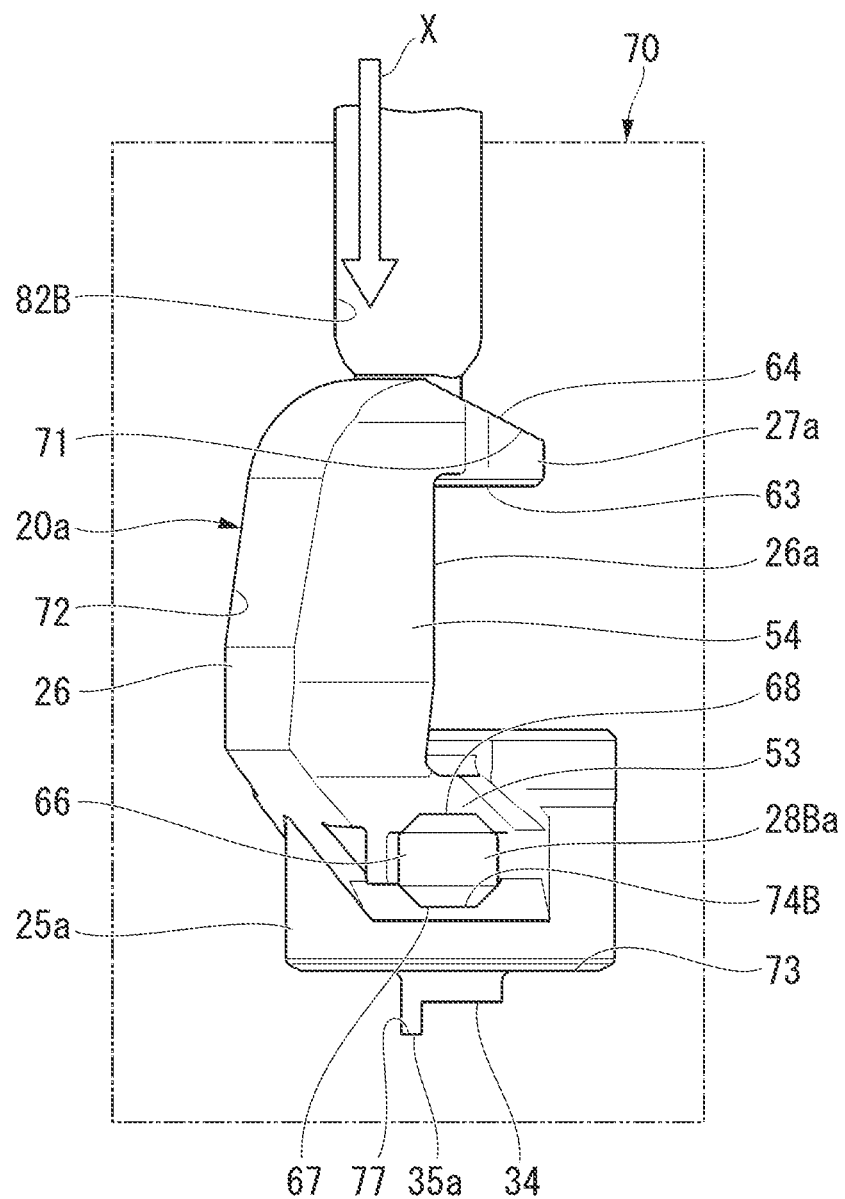
FIG. 3 is a side view showing the casting material of the caliper body and the mold according to the first embodiment of the present invention.

FIGS. 2 and 3 show a casting material 20a of the caliper body 20. This casting material 20a has a cylinder-part constituent part 25a that becomes the cylinder part 25, a claw-part constituent part 27a that becomes the bridge part 26 and the claw part 27, and a pair of arm-part constituent parts 28Aa and 28Ba that protrude from an end of the bridge part 26 on the opposite side of the claw-part constituent part 27a toward both sides in the disk rotor circumferential direction (the left and right direction in FIG. 2).

The cylinder-part constituent part 25a is a member in a state before the cylinder bore 32, the recess part 36, and the bottom hole 38 are cut in the above-described cylinder part 25. The cylinder-part constituent part 25a has the pedestal part 34, and a locking-protrusion-part constituent part 35a before the recess part 36 of the pair of locking protrusion parts 35 is formed. That is, the pedestal part 34 and the locking-protrusion-part constituent part 35a are formed during casting.

The bridge part 26 is formed during casting. The bridge part 26 has a connection part 53 overlapped with the cylinder-part constituent part 25a in the disk rotor axial direction (the up and down direction in FIGS. 2 and 3), and an extension part 54 extending to the outside beyond the cylinder-part constituent part 25a in the disk rotor axial direction.

The connection part 53 spreads from the positions of both outer sides in the disk rotor circumferential direction of the cylinder-part constituent part 25a toward the outside of the disk rotor circumferential direction, as shown in FIG. 2. Further, the connection part 53 is inclined so as to be located on the outside (the left side in FIG. 3) of the disk rotor radial direction as approaching to the claw-part constituent part 27a side in the disk rotor axial direction as shown in FIG. 3. The extension part 54 is connected to the claw-part constituent part 27a side of the connection part 53 and extends along the disk rotor axial direction in a state where it is widened in the disk rotor circumferential direction.

In the bridge part 26, the through-hole 50 is also formed during casting, as shown in FIG. 2. In the first embodiment, one through-hole 50 is formed. The through-hole 50 is formed so that a length A in the disk rotor circumferential direction on the side of the claw-part constituent part 27*a* is greater than a length B in the disk rotor circumferential direction on the side of the cylinder-part constituent part 25*a*. In particular, the through-hole 50 includes an end face part 58, a pair of inclined face parts 59, and an end face part 60. The end face part 58 is disposed closest to the claw-part constituent part 27*a* side, and is curved so as to be located on the side of the cylinder-part constituent part 25*a* as approaching to both end sides in the disk rotor radial direction. The pair of inclined face parts 59 extend while inclining from both ends in the disk rotor circumferential direction of the end face part 58 toward the cylinder-part constituent part 25*a* so that a distance therebetween decreases as approaching to the side of the cylinder-part constituent part 25*a*. The end face part 60 is curved to interconnect the inclined face parts 59 on the opposite side of the end face part 58.

The claw-part constituent part 27*a* extends from the extension part 54 of the bridge part 26 on the opposite side of the connection part 53 toward the inside (the right side in FIG. 3) of the disk rotor radial direction, as shown in FIG. 3. The claw-part constituent part 27*a* is configured so that an opposing face 63 facing the cylinder-part constituent part 25*a* is perpendicular to the disk rotor axial direction. The claw-part constituent part 27*a* is provided with an inclined face 64. The inclined face 64 is formed so as to incline at the claw-part constituent part 27*a* on the opposite side of the cylinder-part constituent part 25*a* so as to be located on the side of the cylinder-part constituent part 25*a* in the disk rotor axial direction as approaching to the inside of the disk rotor radial direction.

The pair of arm-part constituent parts 28Aa and 28Ba shown in FIG. 2 are members in a state before a pin hole extending in the disk rotor axial direction to hold a connection pin slidably connected to the carrier (not shown), and faces of both sides in the disk rotor axial direction are cut. The pair of arm-part constituent parts 28Aa and 28Ba each includes a base plate part 66 having a rectangular cross section, a protrusion part 67, and a protrusion part 68. The base plate part 66 protrudes from a proximal end side of the connection part 53 of the bridge part 26 to both sides in the disk rotor circumferential direction to be perpendicular to the disk rotor axial direction. The protrusion part 67 slightly protrudes from the base plate part 66 toward the opposite side of the claw-part constituent part 27*a* in the disk rotor axial direction. The protrusion part 68 slightly protrudes from the base plate part 66 to the claw-part constituent part 27*a* in the disk rotor axial direction. The protrusion parts 67 and 68 are portions where the faces of both sides in the disk rotor axial direction will be cut later.

The casting material 20*a* having the above-mentioned shape is formed by a mold 70. The mold 70 has a claw-part forming cavity part 71 forming the claw-part constituent part 27*a*, a bridge-part forming cavity part 72 forming the bridge part 26, a cylinder-part forming cavity part 73 forming the cylinder-part constituent part 25*a*, and a pair of arm-part forming cavity parts 74A and 74B forming the pair of arm-part constituent parts 28Aa and 28Ba.

The cylinder-part forming cavity part 73, which becomes a region corresponding to the cylinder part 25, has a protrusion-side forming cavity part 77 forming the pedestal part 34 and a locking-protrusion-part constituent part 35*a*. The protrusion-side forming cavity part 77 is formed at an intermediate position in the disk rotor circumferential and radial directions of the cylinder-part forming cavity part 73 so as to be recessed toward the opposite side of the claw-part forming cavity part 71 in the disk rotor axial direction. Alternatively, the protrusion-side forming cavity part 77 may be disposed at an arbitrary position, as long as the arbitrary position is the intermediate position in the disk rotor circumferential and radial directions of the cylinder-part forming cavity part 73, except for an end in the disk rotor circumferential and radial directions of the cylinder-part forming cavity part 73. Further, the cylinder-part forming cavity part 73 has a core (not shown) for forming a pilot hole of the cylinder bore 32.

The bridge-part forming cavity part 72, which is a region corresponding to the bridge part 26, has a through-hole forming part 80 for forming the above-described through-hole 50. The through-hole forming part 80 is disposed in a central position in the disk rotor circumferential direction of the bridge-part forming cavity part 72. A width of the through-hole forming part 80 in the disk rotor circumferential direction is configured so that the side of the claw-part forming cavity part 71 is greater than the side of the cylinder-part forming cavity part 73.

The mold 70 is a mold for gravity casting. During casting, i.e. when molten metal is poured, the mold 70 is disposed so that the cylinder-part forming cavity part 73 is located at a lower side in a vertical direction and the claw-part forming cavity part 71 is located at an upper side in the vertical direction. As a result, the through-hole forming part 80 of the bridge-part forming cavity part 72 is formed so that the upper portion in the vertical direction is larger than the lower portion in the vertical direction.

The mold 70 is provided with two sprues 82A and 82B, which are spaced apart from each other in the disk rotor circumferential direction, on the opposite side of the cylinder-part forming cavity part 73 (i.e. the upper portion in the vertical direction) of the claw-part forming cavity part 71, which is a region corresponding to the claw part 27. The sprues 82A and 82B have the same channel cross section. The sprues 82A and 82B are provided in a symmetrical shape at positions symmetrical with respect to the middle in the disk rotor circumferential direction of the claw-part forming cavity part 71. Thus, the sprues 82A and 82B are disposed in the same position in the disk rotor axial direction of the claw-part forming cavity part 71. Directions of center lines of the sprues 82A and 82B are the same as the disk rotor axial direction, and the sprues 82A and 82B and the cylinder-part forming cavity part 73 are substantially parallel to each other. Further, the number of sprues is preferably at least two.

Figure 4:
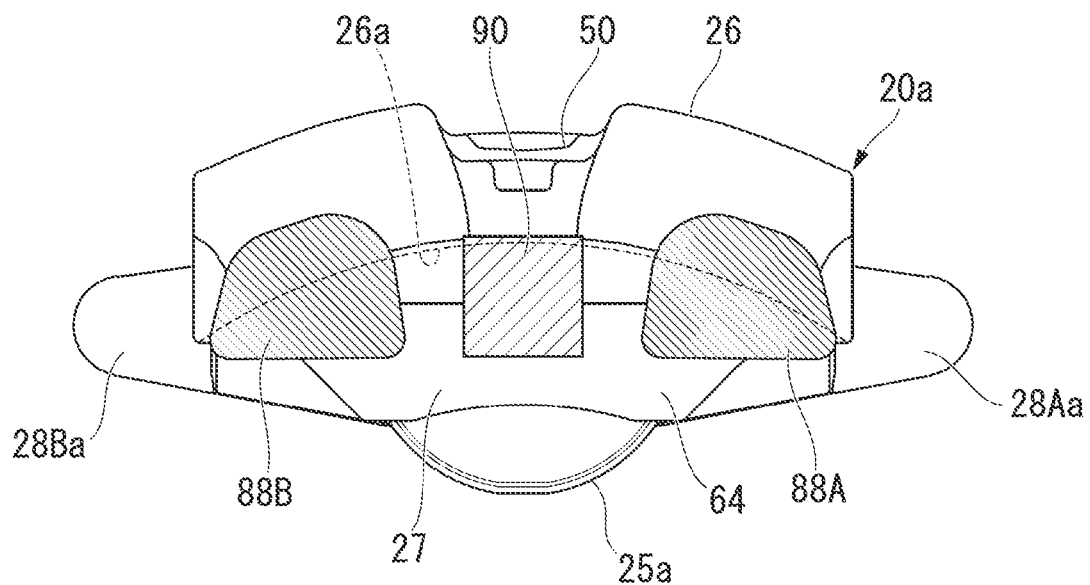
FIG. 4 is a plane view showing the casting material of the caliper body according to the first embodiment of the present invention.

Referring to a relationship between the sprues 82A and 82B and the bridge-part forming cavity part 72 along the disk rotor axial direction, an inner circumferential surface 26*a* (indicated by a dotted line) of the bridge part 26 corresponding to the bridge-part forming cavity part 72 is located at an approximately middle portion of each of sprue cutting faces 88A and 88B corresponding to the sprues 82A and 82B, as shown in FIG. 4. Here, the relationship between the sprues 82A and 82B and the bridge-part forming cavity part 72 in the disk rotor axial direction is preferably set so that the sprues 82A and 82B and the bridge-part forming cavity part 72 are linearly matched with each other. This allows molten metal to be poured from the sprues 82A and 82B and then to rapidly run into the bridge-part forming cavity part 72 without resistance.

However, since an outer circumference side of the claw part 27 is adjacent to the wheel, there are cases where a corner radius (R) must be formed as shown in FIG. 3. In this case, the sprues 82A and 82B are limited in their location. To reduce resistance to flow of the molten metal caused by the sprues 82A and 82B, or to exert a feeding effect of the molten metal stored in the sprues 82A and 82B on the entire claw-part forming cavity part 71, the sprues 82A and 82B must have appreciable cross-sectional areas. For this reason, it is often difficult to provide the sprues 82A and 82B only at positions linearly matched with the bridge-part forming cavity part 72 due to the sizes of the sprues 82A and 82B or limitations to the positions where the sprues 82A and 82B are provided. In this embodiment, when the sprues 82A and 82B and the bridge-part forming cavity part 72 are viewed in the disk rotor axial direction, the areas of the sprues 82A and 82B at least overlap with the area of the bridge-part forming cavity part 72 in the position aspect. It is preferable that the overlapping area be as large as possible from the viewpoint of the flow of the molten metal.

The mold 70 is provided with a riser storage part 85 between the sprues 82A and 82B of the claw-part forming cavity part 71 on the opposite side of the cylinder-part forming cavity part 73. The riser storage part 85 is disposed at the middle in the disk rotor circumferential direction of the claw-part forming cavity part 71. The riser storage part 85 is disposed at a position overlapping with the two sprues 82A and 82B in the disk rotor radial direction.

Here, in the mold 70, the two sprues 82A and 82B are disposed at positions where they do not interfere the through-hole forming part 80, i.e., the through-hole 50, in the up and down direction. In other words, the two sprues 82A and 82B are disposed so that the through-hole forming part 80, i.e., the through-hole 50, is not located within a range where the two sprues 82A and 82B are projected in a vertical direction (in the disk rotor axial direction). In other words, the two sprues 82A and 82B are disposed so as not to overlap with the through-hole forming part 80, i.e., the through-hole 50, in a horizontal direction in the position aspect.

Further, in the mold 70, the above-described riser storage part 85 is formed above the through-hole forming part 80 that is a region where the through-hole 50 is formed between the two sprues 82A and 82B of the claw-part forming cavity part 71. Specifically, the riser storage part 85 is formed so that the entire through-hole 50 is located within a range where the riser storage part 85 is projected in the vertical direction (the disk rotor axial direction), when viewed from the outside of the disk rotor radial direction, as shown in FIG. 2. Further, a core (not shown) is fitted into the cylinder-part forming cavity part 73 of the mold 70 to form a recess part that facilitates machining the cylinder bore 32 of the cylinder part 25. When an evaporative core is used as one example of this core, the core is lost after casting, so that the recess part can be easily formed.

Next, a gravity casting method using the above-described mold 70 will be described. First, the mold 70 is prepared. The molten metal of an aluminum alloy is poured from the two sprues 82A and 82B in the upper portion of the mold 70 toward the lower portion of the mold as indicated by an arrow X in FIGS. 2 and 3. In the pouring of the molten metal, when the molten metal is forced to uniformly run to the entire region in left and right directions of the sprues 82A and 82B in FIG. 3, the molten metal runs against a region of forming the opposite face 63 of the claw-part forming cavity part 71 to form a turbulent flow on the left region. Here, the molten metal is forced to run along the left region as indicated by the arrow X of FIG. 3, so that it is possible to smoothly pour the molten metal into the bridge-part forming cavity part 72. The molten metal runs from the claw-part forming cavity part 71 to the cylinder-part forming cavity part 73 through the bridge-part forming cavity part 72 as indicated by an arrow X1 of FIG. 2, thereby starting to be filled from the lowermost portion of the cylinder-part forming cavity part 73, i.e., from the protrusion-side forming cavity part 77. The molten metal is filled into the cylinder-part forming cavity part 73, the pair of arm-part forming cavity parts 74A and 74B, and the bridge-part forming cavity part 72 approximately from the lower side. And then the molten metal is filled into the claw-part forming cavity part 71, and poured to the riser storage part 85. As a result, the molten metal filled into the cylinder-part forming cavity part 73 first (i.e., the molten metal of the lower portion of the cylinder-part forming cavity part 73) starts to solidify, and the molten metal in the cylinder-part forming cavity part 73, the pair of arm-part forming cavity parts 74A and 74B, and the bridge-part forming cavity part 72 solidify from approximately the lower side to the upper side. Thus the molten metal of the claw-part forming cavity part 71 is almost entirely solidified. In the meantime, the molten metal stored in the sprues 82A and 82B and the riser storage part 85 compensates a shrinkage fraction caused by the solidification of the molten metal.

That is, the casting material 20a is designed so that the molten metal starts to be solidified from the side of the cylinder-part constituent part 25a. Thus, from the aspect of the caliper body 20, the solidification of the molten metal is initiated from the side of the cylinder-part constituent part 25a.

In a state where the molten metal is converted into solid, the mold 70 is subjected to shake-out, and thereby the casting material 20a is obtained. Although not shown, this casting material 20a has a shape where cast remaining in the sprues 82A and 82B and a cast remaining in the riser storage part 85 remains at the claw-part constituent part 27a. The cast remaining in the sprues 82A and 82B and the cast remaining in the riser storage part 85 is removed by cutting, thereby the claw part 27 is formed. Thus, the claw part 27 of the caliper body 20 has two sprue cut surfaces 88A and 88B and one riser cut surface 90, which are indicated by hatch-line portions of FIG. 4.

The two sprue cut surfaces 88A and 88B are formed on an end face of the claw part 27 on the opposite side of the cylinder-part constituent part 25a in the disk rotor axial direction (the direction perpendicular to the plane of the sheet in FIG. 4). The two sprue cut surfaces 88A and 88B are located at two places on both sides in the disk rotor circumferential direction (the left and right direction in FIG. 4). In particular, the two sprue cut surfaces 88A and 88B are formed in a symmetrical shape at positions where they are symmetrical with respect to the middle in the disk rotor circumferential direction of the claw part 27, and are disposed at equal positions in the disk rotor radial direction (the up and down direction in FIG. 4) of the claw part 27. The two sprue cut surfaces 88A and 88B are configured so that a total length (in this case, length of two sprues) in the disk circumferential direction thereof is greater than a length of the disk rotor radial direction thereof, and that, even in comparison with a length in the disk circumferential direction of one of the sprue cut surfaces 88A and 88B, this length is greater than the length in the disk rotor radial direction thereof.

The riser cut surface 90 is formed on an end face of the claw part 27 on the opposite side of the cylinder-part constituent part 25*a* in the disk rotor axial direction, and is located between the two sprue cut surfaces 88A and 88B of the claw part 27. In particular, the riser cut surface 90 is formed at the middle in the disk rotor circumferential direction of the claw part 27, and is formed at a position corresponding to the through-hole 50 in the disk rotor axial direction when viewed from the outside of the disk rotor radial direction (the upper side in FIG. 4). In other words, the riser cut surface 90 overlaps with the through-hole 50 in the disk rotor circumferential direction. The riser cut surface 90 overlaps with the two sprue cut surfaces 88A and 88B in the disk rotor radial direction.

Here, in the caliper body disclosed in "SAE TECHNICAL PAPER SERIES 1999-01-0346," (US) SAE international, Mar. 1 to 4, 1999, an end face of the cylinder-part on the opposite side of the claw part of a bottom part is cast as the sprue. For this reason, it is difficult to form a detailed shape of the cylinder-part bottom part by means of casting because it is necessary to avoid interference with the sprue and to secure a channel of molten metal. That is, for example, in a structure where a brake pipe is connected to the cylinder-part bottom part, a countermeasure, for instance, a separate member attached for anti-rotation of a mouthpiece of the brake pipe, is required.

In contrast, according to the first embodiment, when the cylinder part 25, the bridge part 26, and the claw part 27 of the caliper body 20 are integrally cast, sprue cut surfaces 88A and 88B are located in at least two positions on the end face in the disk rotor axial direction on both sides in the disk rotor circumferential direction of the claw part 27. For this reason, the mold 70, in which the sprues 82A and 82B are provided at two places spaced in the disk rotor circumferential direction of the claw-part forming cavity part 71 that is the region corresponding to the claw part 27, is prepared. The caliper body 20 is manufactured by pouring molten metal from the two sprues 82A and 82B of the mold 70 so as to cause the molten metal to start to solidify from the cylinder part 25. Thus, since the bottom part 31 of the cylinder part 25 can be formed distant from the sprues 82A and 82B, the detailed shape of the bottom part 31 of the cylinder part 25 can be formed by casting. In particular, the pedestal part 34 for connecting the brake pipe to the bottom part 31 of the cylinder part 25, and the locking-protrusion-part constituent part 35*a* including the pair of locking protrusion parts 35 before the recess part 36 is formed as described above can be formed by casting. Thus, it is possible to improve the manufacturing efficiency of the caliper body 20.

Further, when the molten metal is poured from the two sprues 82A and 82B, the mold 70 is disposed so that the cylinder-part forming cavity part 73 forming the cylinder part 25 is located in a lower portion in the vertical direction and the claw-part forming cavity part 71 forming the claw part 27 is located in an upper portion in the vertical direction. For this reason, for example, in the case where the casting is performed by gravity casting, when the molten metal is poured from the two sprues 82A and 82B of the upper portion of the mold 70, the molten metal can be well filled from the side of the cylinder-part forming cavity part 73 forming the cylinder part 25 by gravity. Thus, even when the cylinder part 25 has a relatively complicated shape, it can be well formed by casting.

Further, since the two sprues 82A and 82B are formed in the positions where the sprues 82A and 82B does not interfere with the through-hole forming part 80, i.e., the through-hole 50, in the up and down direction, the molten metal poured from the two sprues 82A and 82B bypasses the through-hole forming part 80, thereby it becomes possible to prevent the molten metal from directly running against the through-hole forming part 80. Thereby, it is possible to suppress a turbulent flow of the molten metals poured from the two sprues 82A and 82B and to suppress spiral blow holes, cold shut, and so on.

Further, the claw part 27 of the caliper body 20 has the riser cut surface 90 that is interposed between the two sprue cut surfaces 88A and 88B and is formed at a position corresponding to the through-hole 50 in the disk rotor axial direction. For this reason, the mold 70 has the riser storage part 85 formed at the upper portion of the through-hole forming part 80 that is the region forming the through-hole 50 between the two sprue cut surfaces 88A and 88B of the claw part 27. Thus, it is possible to easily supplement the molten metal from the riser storage part 85 toward both sides, and thus to prevent sink marks, and so on. Particularly, since the molten metal can be easily supplemented at a portion between the claw part 27 and the through-hole 50, it is possible to prevent sink marks, etc. generated from this portion.

Also, the through-hole 50 of the caliper body 20 is formed so that the length in the disk rotor circumferential direction at the side of the claw part 27 is greater than the length in the disk rotor circumferential direction at the side of the cylinder part 25. For this reason, in the mold 70, the through-hole forming part 80 forming the through-hole 50 of the bridge part 26 is formed so that the vertical upper side thereof is larger than the vertical lower side thereof. Thus, it is possible to still further suppress the turbulent flow of the molten metals poured from the two sprues 82A and 82B, and to further suppress the spiral blow holes, the cold shut, and so on. In particular, if the upper side in the vertical direction of the through-hole forming part 80 is small, the molten metals poured from the two sprues 82A and 82B are joined at that portion, thereby generating a turbulent flow. In the present embodiment, however, such kind of turbulent flow can be prevented.

Further, since the claw part 27 covers the central axis of the cylinder bore 32 and is disposed so as to be opposite to the cylinder bore 32, it is possible to increase rigidity of the claw part 27 and to suppress brake noise.

In addition, the sprue cut surfaces 88A and 88B are located at the end face in the disk rotor axial direction of the claw part 27. The sprue cut surfaces 88A and 88B are configured so that the total length in the disk rotor circumferential direction is greater than the length in the disk rotor radial direction. For this reason, it is possible to improve castability of the caliper body 20.

Second Embodiment

Next, the second embodiment will be described, mainly focusing on parts different from the first embodiment with reference to FIGS. 5 and 6. Further, the same terms and numerals are provided for parts common with the first embodiment.

Figure 5:
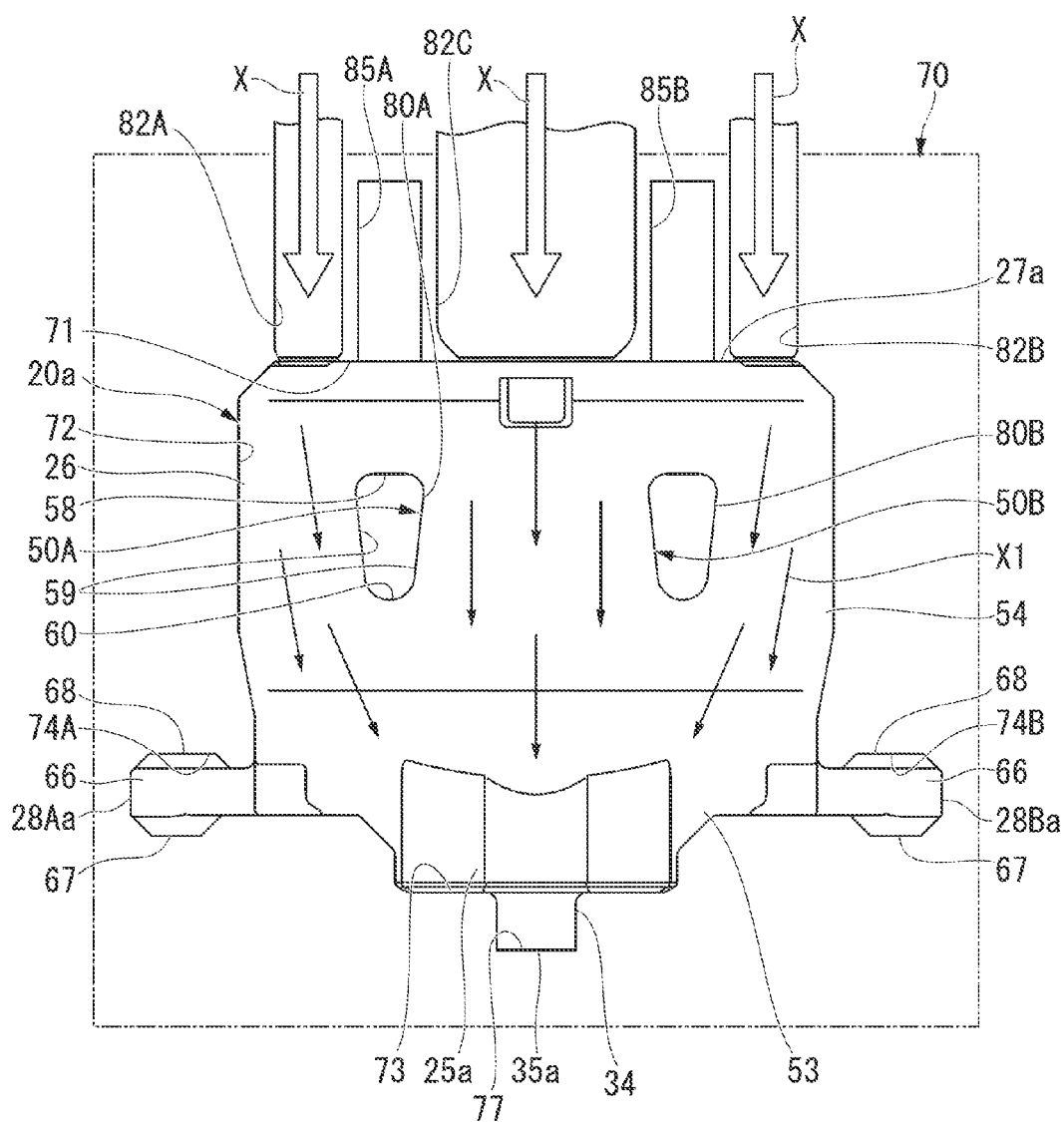
FIG. 5 is a front view showing a casting material of a caliper body and a mold according to a second embodiment of the present invention.
Figure 6:
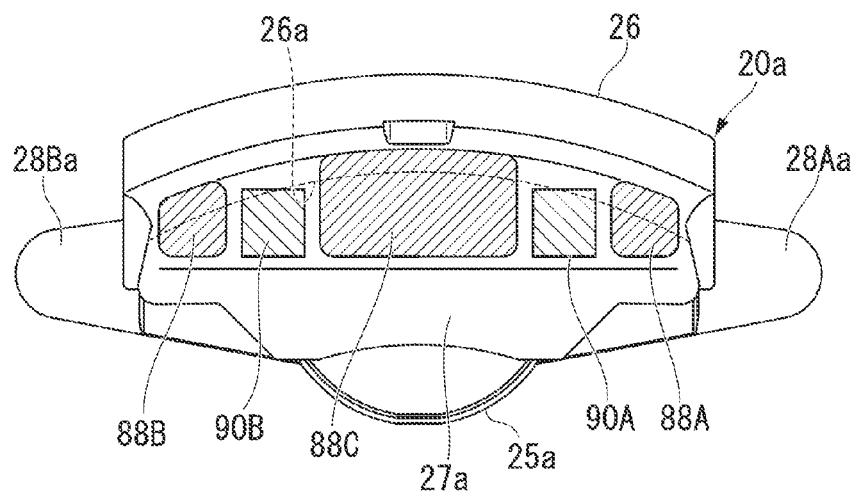
FIG. 6 is a plane view showing the casting material of the caliper body according to the second embodiment of the present invention.

FIGS. 5 and 6 show a casting material 20*a* of a caliper body of the second embodiment. In this casting material 20*a*, two through-holes 50A and 50B are formed in a bridge part 26, spaced apart from each other in a disk rotor circumferential direction. The through-holes 50A and 50B are formed so that a length in the disk rotor circumferential direction on the side of a claw-part constituent part 27*a* is greater than the length in the disk rotor circumferential direction on the side of a cylinder-part constituent part 25*a*.

Thus, a bridge-part forming cavity part 72 of the mold 70 has two through-hole forming parts 80A and 80B to form the through-holes 50A and 50B. These through-hole forming parts 80A and 80B are provided in a symmetrical shape at positions symmetrical with respect to a middle position in the disk rotor circumferential direction of the bridge-part forming cavity part 72, and each is configured so that a width in the disk rotor circumferential direction on the side of a claw-part forming cavity part 71 is greater than a width in the disk rotor circumferential direction on the side of a cylinder-part forming cavity part 73.

In the mold 70, three sprues 82A, 82B and 82C are provided in the claw-part forming cavity part 71, which is a region corresponding to the claw part 27, on the opposite side of the cylinder-part forming cavity part 73 (i.e., in the upper part in the vertical direction) to be spaced apart from one another in the disk rotor circumferential direction. The sprues 82A and 82B on both sides are provided in a symmetrical shape at positions symmetrical with respect to the middle in the disk rotor circumferential direction of the claw-part forming cavity part 71. The other sprue 82C is disposed at the middle in the disk rotor circumferential direction of the claw-part forming cavity part 71. The sprues 82A and 82B on both sides are disposed at the same position in the disk rotor axial direction of the claw-part forming cavity part 71. The other sprue 82C is matched with positions of inner ends in the disk rotor axial direction of the opposite sprues 82A and 82B. The sprues 82A and 82B on both sides have the same channel cross-sectional area, and the central sprue 82C has a greater channel cross-sectional area than the sprues 82A and 82B on both sides. The central sprue 82C is configured so that a length in the disk rotor circumferential direction is greater than a length in the disk rotor radial direction.

In the mold 70, a riser storage part 85A is provided between the sprues 82A and 82C at the claw-part forming cavity part 71 on the opposite side of the cylinder-part forming cavity part 73, and another riser storage part 85B is provided between the sprues 82B and 82C at the claw-part forming cavity part 71 on the opposite side of the cylinder-part forming cavity part 73. These riser storage parts 85A and 85B are provided in a symmetrical shape at positions where they are symmetrical with respect to the middle in the disk rotor circumferential direction of the claw-part forming cavity part 71, and overlap with the three sprues 82A, 82B and 82C in the disk rotor radial direction.

Here, the three sprues 82A, 82B and 82C of the mold 70 are formed at positions where does not interfere with the two through-holes 50A and 50B in the up and down direction. That is, the three sprues 82A, 82B and 82C are formed so that the two through-holes 50A and 50B are not located within a range where the three sprues 82A, 82B and 82C are projected in this vertical direction (in the disk rotor axial direction). In other words, the three sprues 82A, 82B and 82C are disposed so as not to overlap with the two through-holes 50A and 50B in a horizontal direction in the positional aspect.

Further, in the mold 70, the riser storage parts 85A and 85B are formed above the through-hole forming parts 80A and 80B between the three sprues 82A, 82B and 82C of the claw-part forming cavity part 71. Particularly, when viewed from the outside of the disk rotor radial direction, the riser storage part 85A is formed so that the through-hole forming part 80A, i.e., the through-hole 50A, is located within a range where the riser storage part 85A is projected in the vertical direction (the disk rotor axial direction). When viewed from the outside of the disk rotor radial direction, the riser storage part 85B is formed so that the through-hole forming part 80B, i.e., the through-hole 50B, is located within a range where the riser storage part 85B is projected in the vertical direction (the disk rotor axial direction).

In the casting process in the present embodiment, the mold 70 is prepared, and molten metal is poured from the three sprues 82A, 82B and 82C of the upper portion of the mold 70 toward the lower portion of the mold 70 as indicated by an arrow X in FIG. 5. Then, the molten metal runs from the claw-part forming cavity part 71 to the cylinder-part forming cavity part 73 through the bridge-part forming cavity part 72, thereby the molten metal starts to fill from the lowermost portion of the cylinder-part forming cavity part 73, i.e., from a protrusion-side forming cavity part 77. Then, the molten metal is filled into the cylinder-part forming cavity part 73, a pair of arm-part forming cavity parts 74A and 74B, and the bridge-part forming cavity part 72 in turn from the lower side, then filled into the claw-part forming cavity part 71, and poured to the riser storage parts 85A and 85B. As a result, the molten metal filled into the cylinder-part forming cavity part 73 (i.e., the molten metal of the lower portion of the cylinder-part forming cavity part 73) starts to solidify first, and the molten metal in the cylinder-part forming cavity part 73, the pair of arm-part forming cavity parts 74A and 74B, and the bridge-part forming cavity part 72 solidifies from substantially the lower side to the upper side. The molten metal of the claw-part forming cavity part 71 is almost entirely solidified. In the meantime, the molten metal stored in the sprues 82A, 82B and 82C and the riser storage parts 85A and 85B compensates a shrinkage fraction caused by the solidification of the molten metal.

In a state where the molten metal is converted into solid, the mold 70 is subjected to shake-out, and thereby the casting material 20a is obtained. Although not shown, this casting material 20a has a shape where cast remaining in the sprues 82A, 82B and 82C and cast remaining in the riser storage parts 85A and 85B remains at the claw-part constituent part 27a. The cast remaining in the sprues 82A, 82B and 82C and the cast remaining in the riser storage parts 85A and 85B is removed by cutting, so that the claw part 27 is formed. Thus, the claw part 27 of the caliper body 20 has three sprue cut surfaces 88A, 88B and 88C and two riser cut surfaces 90A and 90B, which are indicated by hatch-line portions of FIG. 6.

The sprue cut surfaces 88A, 88B and 88C are formed on an end face of the claw part 27 on the opposite side of the cylinder-part constituent part 25a in the disk rotor axial direction. The sprue cut surfaces 88A and 88B are formed in a symmetrical shape at positions where they are symmetrical with respect to the middle of the disk rotor circumferential direction of the claw part 27. The sprue cut surface 88C is formed in a shape where it is symmetrical with respect to the middle in the disk rotor circumferential direction of the claw part 27. The sprue cut surfaces 88A, 88B and 88C overlap with one another in the disk rotor radial direction of the claw part 27 in the positional aspect. These sprue cut surfaces 88A, 88B and 88C are configured so that a total length (in this case, length of three sprues) in the disk rotor circumferential direction thereof is greater than a length in the disk rotor radial direction of the sprue cut surface 88C that has the greatest length among them. Further, in the central sprue cut surface 88C, a length in the disk circumferential direction thereof is greater than the length in the disk rotor radial direction thereof.

The riser cut surfaces 90A and 90B are formed on the end face of the claw part 27 on the opposite side of the cylinder-part constituent part 25*a* in the disk rotor axial direction, and are located between the sprue cut surfaces 88A, 88B and 88C of the claw part 27, respectively. In particular, the riser cut surfaces 90A and 90B are formed in a symmetrical shape at the positions symmetrical with respect to the middle in the disk rotor circumferential direction of the claw part 27. The riser cut surfaces 90A and 90B are formed at positions corresponding to the through-holes 50A and 50B in the disk rotor axial direction when viewed from the outside of the disk rotor radial direction. In other words, the riser cut surface 90A overlaps with the through-hole 50A in the disk rotor circumferential direction, and the riser cut surface 90B overlaps with the through-hole 50B in the disk rotor circumferential direction. These cut surfaces 90A and 90B are superposed on the sprue cut surfaces 88A, 88B and 88C in the disk rotor radial direction.

According to the second embodiment as described above, with respect to one cylinder-part constituent part 25*a*, the two through-holes 50A and 50B are formed in the bridge part 26 of the casting material 20*a* of the caliper body, spaced apart from each other in the disk rotor circumferential direction. For this reason, flowability and solidifiability of the molten metal are further improved, thereby blow holes can be prevented from being generated. The second embodiment is suitable for a casting of the casting material 20*a* having a configuration in that the bridge part 26 and the claw-part constituent part 27*a* are long in the disk rotor circumferential direction, as shown in FIG. 6.

Third Embodiment

Figure 7:
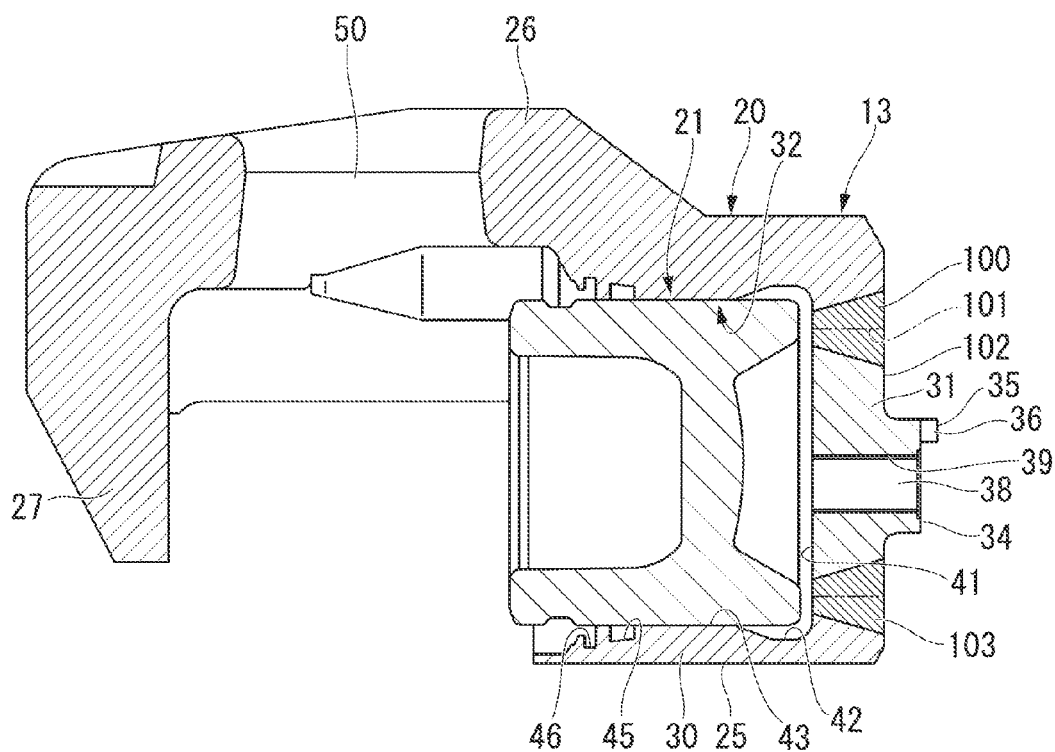
FIG. 7 is a side cross-sectional view showing a caliper body and a piston according to a third embodiment of the present invention.

Next, the third embodiment will be described, mainly focusing on parts different from the first embodiment with reference to FIG. 7. Further, the same terms and numerals are provided for parts common with the first embodiment.

In the third embodiment, a bottom part 31 of a cylinder part 25 of a caliper body 20 is configured of an outer ring-shaped part 100 integrally formed with a cylindrical part 30 during casting and a separate cover member 102 fitted into an opening 101 inside the ring-shaped part 100. The ring-shaped part 100 and the cover member 102 are bonded and integrated by Friction Stir Welding (FSW), thereby forming the bottom part 31. Thus, the bottom part 31 is provided with a ring-shaped FSW part 103. Further, the opening 101 of the ring-shaped part 100 is formed as a threaded hole, and male threads are formed on an outer circumferential surface of the cover member 102. Thereby, the ring-shaped part and the cover member may be screwed and bonded. The cover member 102 is integrally formed with a pedestal part 34 having a bottom hole 38 and female threads 39, a pair of locking protrusion parts 35, and a recess part 36.

Because of the above-mentioned structure, although not shown, a casting material constituting other parts than the cover member 102 of the caliper body 20 is configured so that the opening 101 or an opening serving as a pilot hole for forming the opening 101 by cutting is formed in the bottom part 31. In other words, the cylinder part 25 of the caliper body 20 is cast to include the opening 101 or the opening serving as the pilot hole for forming the opening 101 in the bottom part 31. After casting, a cutting tool (not shown) is inserted from the opening 101 to machine a cylinder bore 32 of the cylinder part 25, and then the opening 101 is closed by the cover member 102.

For this reason, a core for forming the opening 101 or the opening serving as the pilot hole for forming the opening 101 by cutting in the bottom part 31 is installed in the mold.

Here, in the caliper body disclosed in "SAE TECHNICAL PAPER SERIES 1999-01-0346," (US) SAE international, Mar. 1 to 4, 1999, the end face of the cylinder-part bottom part on the opposite side of the claw part is cast as the sprue. For this reason, when the core for forming the opening of the cylinder-part bottom part is installed in the mold, a flow of molten metal is disturbed by the core, so that there is a possibility of manufacturing efficiency of the caliper body being lowered or of castability being deteriorated.

Figure 13:
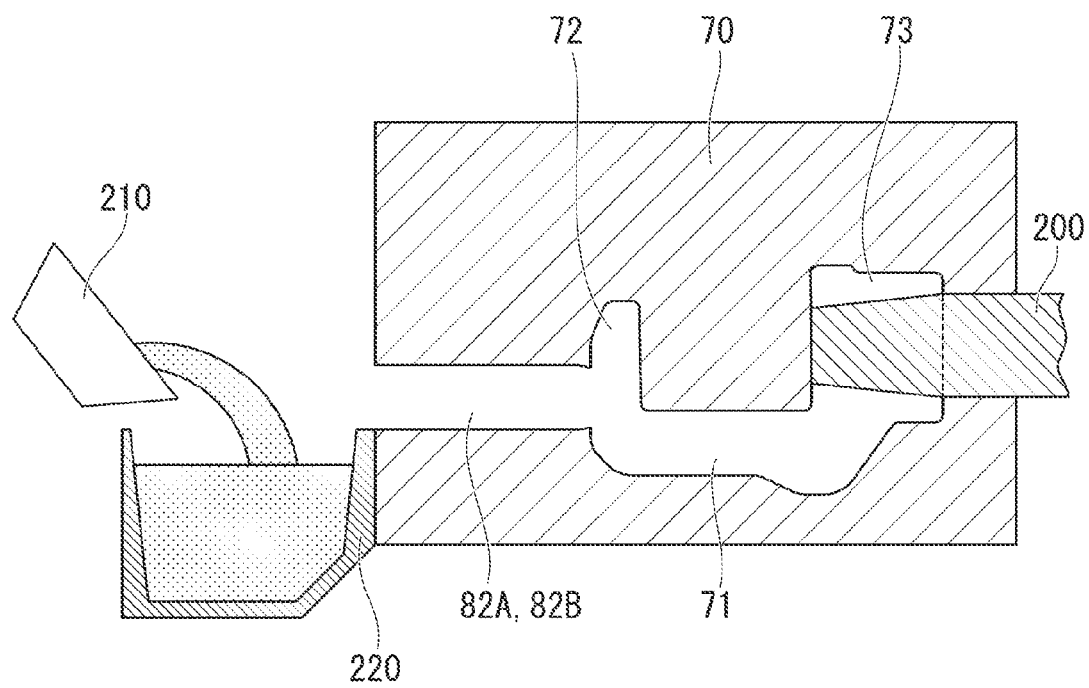
FIG. 13 is a cross-sectional view showing a casting start status of a tilting gravity casting of casting the casting material of the caliper body according to the third embodiment of the present invention.
Figure 14:
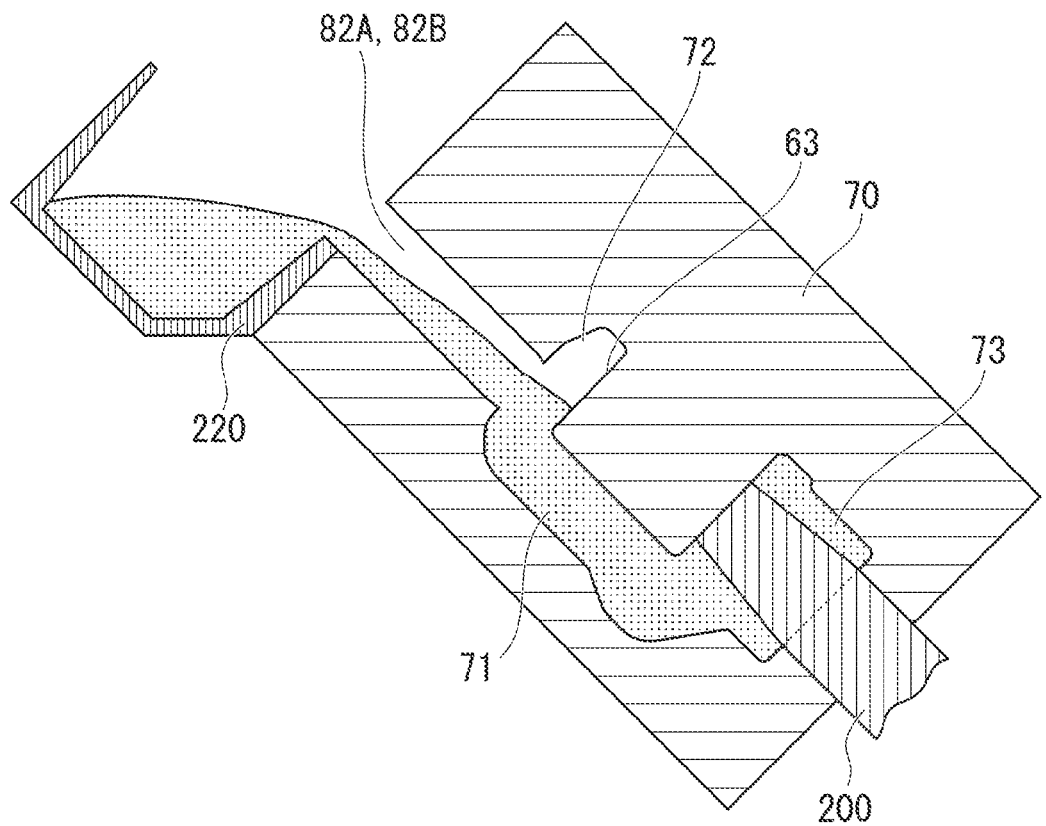
FIG. 14 is a cross-sectional view showing a casting ongoing status of the tilting gravity casting of casting the casting material of the caliper body according to the third embodiment of the present invention.
Figure 15:
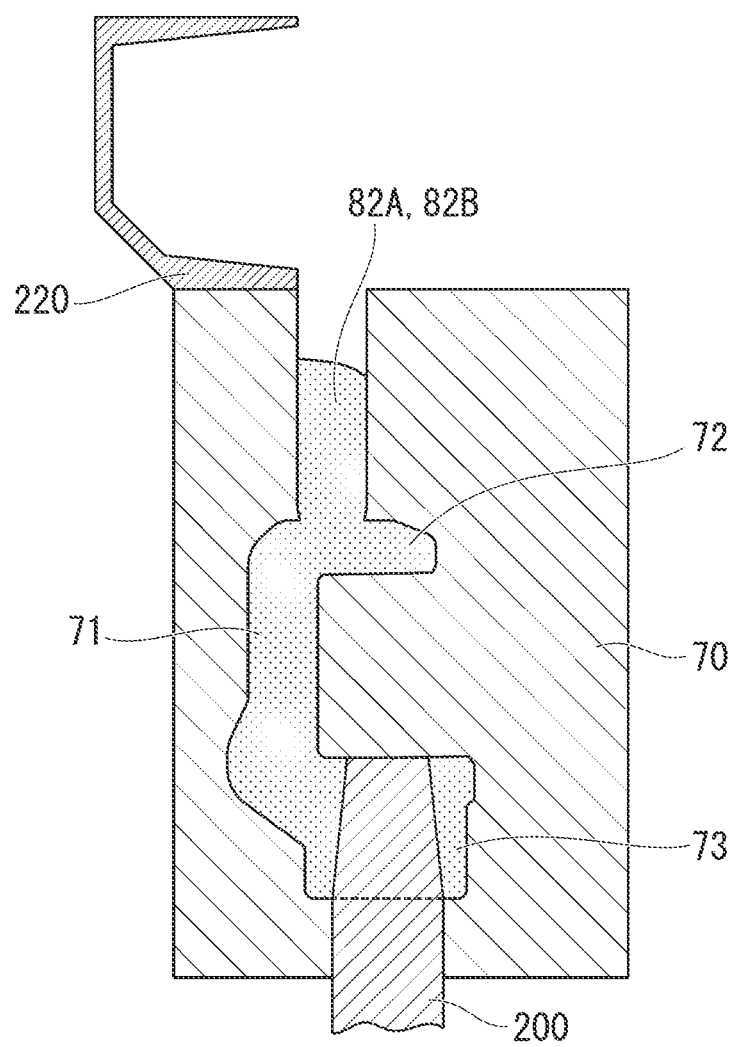
FIG. 15 is a cross-sectional view showing a pouring completion status of the tilting gravity casting of casting the casting material of the caliper body according to the third embodiment of the present invention.

In contrast, according to the third embodiment, although the cylinder part 25 is cast with the opening 101 or the opening serving as the pilot hole of the opening 101 in its bottom part 31, and the opening 101 is configured to be closed by the cover member 102 after casting, the castability is not reduced. In the third embodiment, the casting is conducted by tilting gravity casting, which will be described in particular with reference to FIGS. 13 to 15. First, the mold 70 of the caliper body 20 is prepared and is disposed so that the two sprues 82A and 82B are kept horizontal as shown in FIG. 13. At this time, the bridge-part forming cavity part 72 of the mold 70 is located on the lower side, and a core 200 is inserted into the cylinder-part forming cavity part 73 from the side of the bottom part of the cylinder-part forming cavity part 73 so that a through-hole for machining the cylinder bore 32 is formed after casting. In this state, molten metal is poured into a molten metal storage container 220 from a ladle 210. Then, as in FIG. 14, the mold 70 is slowly rotated so that the molten metal storage container 220 is directed upward, and thereby the molten metal in the molten metal storage container 220 gradually runs from the sprues 82A and 82B to the bridge-part forming cavity part 72 via the claw-part forming cavity part 71. At this time, the molten metal may run along the lower sides of the sprues 82A and 82B into the bridge-part forming cavity part 72 without running up to a region forming an opposing face 63 of the claw-part forming cavity part 71. That is, a rotating speed for moving up the mold 70 is properly controlled, and thereby the molten metal is allowed to gently run from the sprues 82A and 82B into the claw-part forming cavity part 71 and the bridge-part forming cavity part 72. Then, the molten metal runs from the bridge-part forming cavity part 72 to the cylinder-part forming cavity part 73, and starts to be filled from the lowermost portion of the cylinder-part forming cavity part 73. As the mold 70 is rotated, the molten metal is substantially filled to the cylinder-part forming cavity part 73, the pair of arm-part forming cavity parts 74A and 74B, and the bridge-part forming cavity part 72 in turn from the lower side. When the mold 70 continues to be rotated to reach the state of FIG. 15, the molten metal is filled up to a leading end (right side of FIG. 15) of the claw-part forming cavity part 71, and thus is filled into the sprues 82A and 82B and the riser storage part 85 (not shown). As a result, the molten metal filled in the cylinder-part forming cavity part 73 (i.e. the molten metal of the lower portion of the cylinder-part forming cavity part 73) first starts to solidify, and the molten metal in the cylinder-part forming cavity part 73, the pair of arm-part forming cavity parts 74A and 74B, and the bridge-part forming cavity part 72 solidifies substantially from the lower side to the upper side. The molten metal of the claw-part forming cavity part 71 is almost entirely solidified. In the meantime, the molten metal stored in the sprues 82A and 82B and the riser storage part 85 compensates a shrinkage fraction caused by the solidification of the molten metal. In this manner, in the third embodiment, the sprues 82A and 82B can be provided distant from the side of the bottom part 31 of the cylinder part 25 so as to be able to solve the problem that the flowability of the molten metal is reduced because the opening 101 is formed in the bottom part 31 of the cylinder part 25 of the caliper body 20, which is disclosed in "SAE TECHNICAL PAPER SERIES 1999-01-0346," (US) SAE international, Mar. 1 to 4, 1999. Accordingly, it is possible to improve the molten metal flowability during casting, and to increase the manufacturing efficiency of the caliper body 20 and castability. Furthermore, this tilting gravity casting is not limited to the third embodiment, and thus it may be applied to the first and second embodiments or fourth and fifth embodiments and modifications thereof, which will be described below, so that it is possible to obtain the preferable casting material 20a.

Fourth Embodiment

Next, the fourth embodiment will be described, mainly focusing on parts different from the second embodiment with reference to FIGS. 8 to 11. Further, the same terms and numerals are provided for parts common with the second embodiment.

Figure 8:
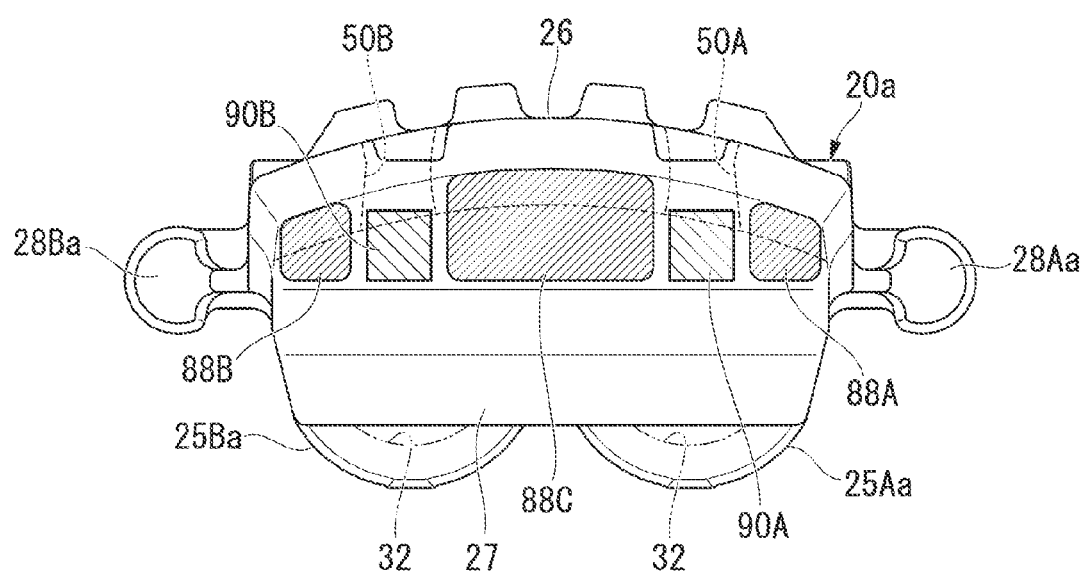
FIG. 8 is a plane view showing a casting material of a caliper body according to a fourth embodiment of the present invention.
Figure 9:
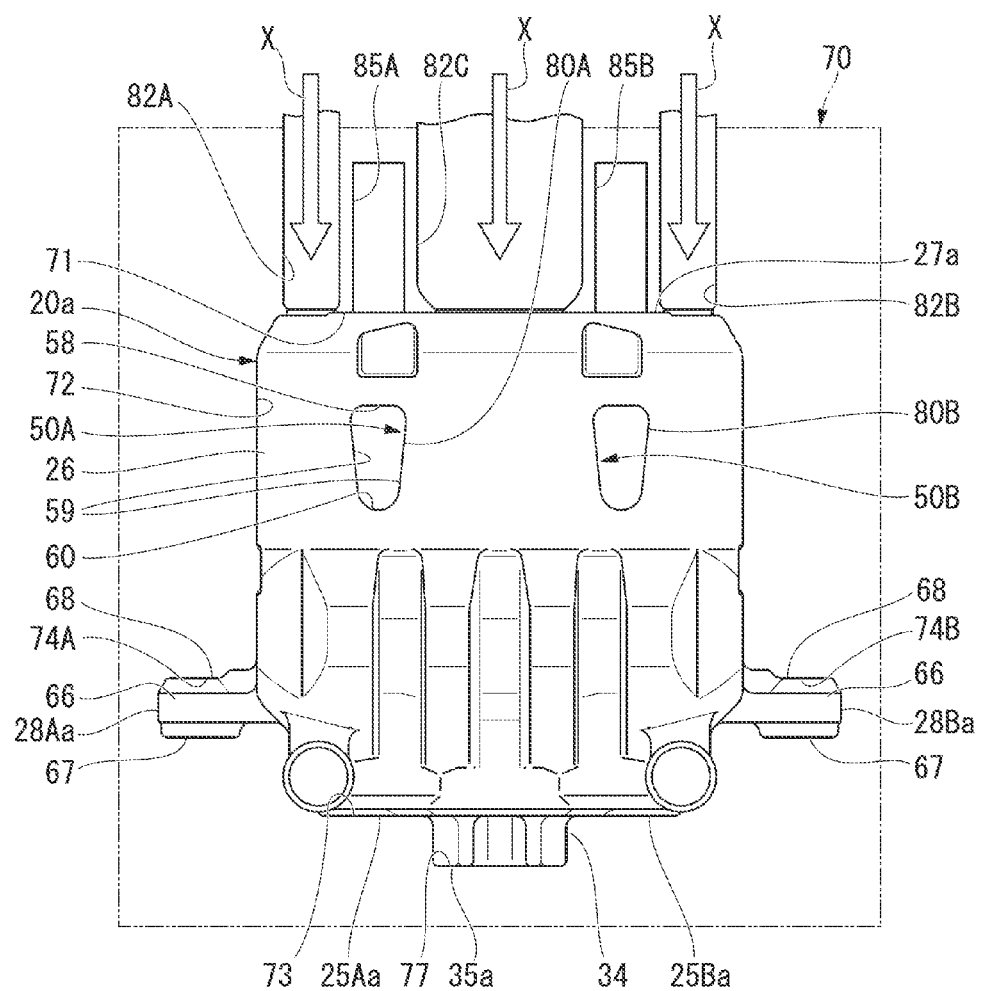
FIG. 9 is a front view showing the casting material of the caliper body and a mold according to the fourth embodiment of the present invention.
Figure 10:
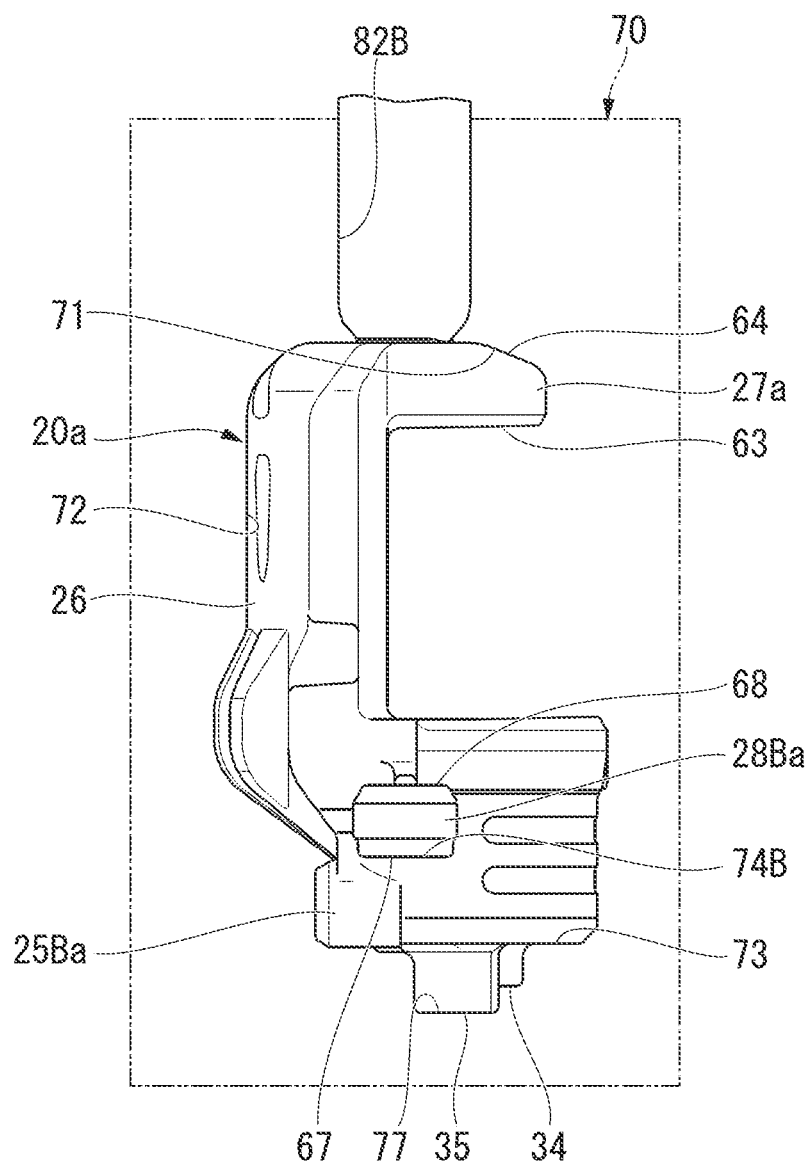
FIG. 10 is a side view showing the casting material of the caliper body and the mold according to the fourth embodiment of the present invention.

FIGS. 8 to 10 show a casting material 20a of a caliper body of the fourth embodiment. In this casting material 20a, two cylinder-part constituent parts 25Aa and 25Ba each having a cylinder bore 32 formed by cutting are provided in parallel in the disk rotor circumferential direction. Thereby, the casting material 20a of the fourth embodiment is configured so that a bridge part 26 and a claw part 27 spread wider in the disk rotor circumferential direction than those of the first embodiment.

As shown in FIG. 9, the bridge part 26 widened in the disk rotor circumferential direction is provided with two through-holes 50A and 50B spaced apart from each other in the disk rotor circumferential direction as in the second embodiment. These through-holes 50A and 50B are formed so that a length of the disk rotor circumferential direction on the side of a claw-part constituent part 27a is greater than a length in the disk rotor circumferential direction on the side of the cylinder-part constituent parts 25Aa and 25Ba.

In the fourth embodiment, a mold 70 casting the casting material 20a is configured so that a cylinder-part forming cavity part 73 has two cores (not shown) for forming pilot holes of the cylinder bores 32.

Figure 11:
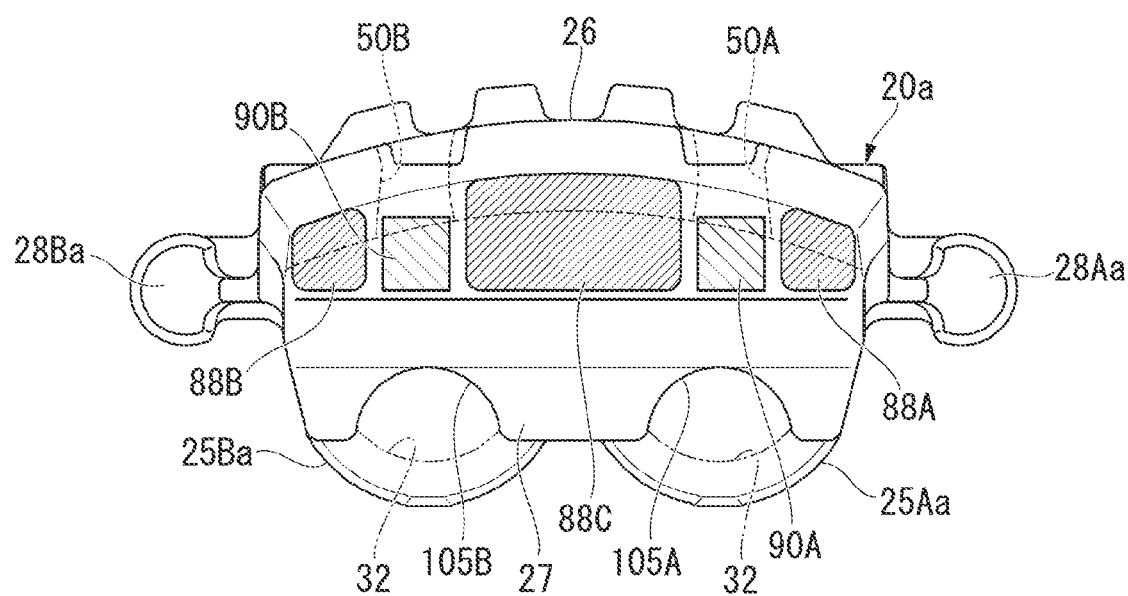
FIG. 11 is a plane view showing a modification of the casting material of the caliper body according to the fourth embodiment of the present invention.

Further, in the fourth embodiment, as shown in FIG. 11, recesses 105A and 105B recessed toward the outside of the disk rotor radial direction may be formed on the inside of the disk rotor radial direction of the claw part 27 so as to be opposite to the respective cylinder bores 32 during casting. These recesses 105A and 105B are formed within a range where the claw part 27 can cover the central axes of the cylinder bores 32.

Fifth Embodiment

Next, the fifth embodiment will be described, mainly focusing on parts different from the first embodiment with reference to FIG. 12. Further, the same terms and numerals are provided for parts common with the first embodiment.

Figure 12:
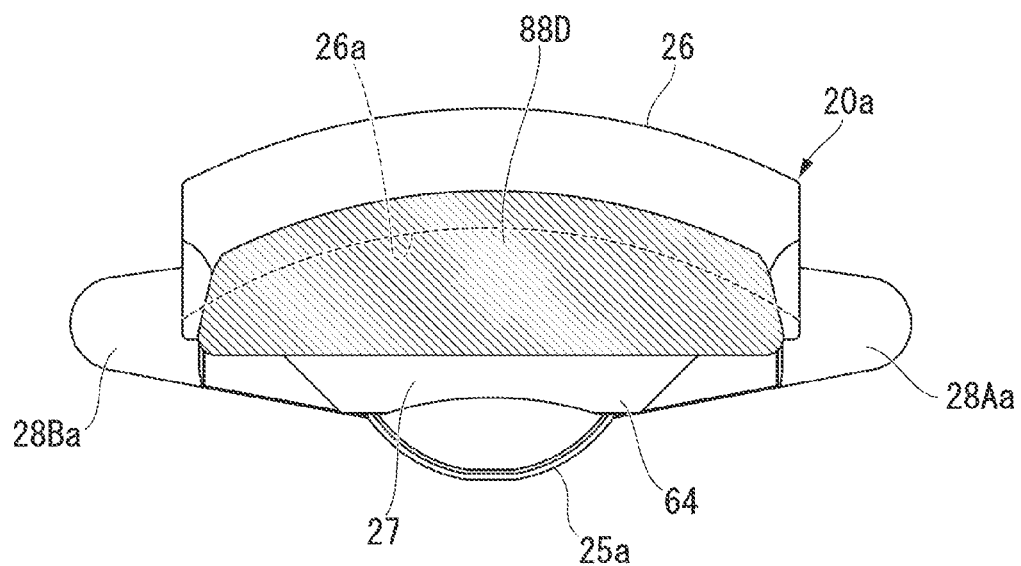
FIG. 12 is a plane view showing a casting material of a caliper body according to a fifth embodiment of the present invention.

FIG. 12 shows a casting material 20a of a caliper body of the fifth embodiment. This casting material 20a is provided with a cylinder-part constituent part 25a having a cylinder bore 32 formed by cutting.

As shown in FIG. 12, a through-hole 50 is not formed, i.e., is omitted, in the upper portion of a bridge part 26. However, if a through-hole 50 is formed in the upper portion of the bridge part 26, it is formed so that a width in the disk rotor circumferential direction is narrow so as not to obstruct a flow of molten metal. After casting, the through-hole 50 is formed in the bridge part 26, for instance, by cutting.

For this reason, no obstacle to the molten metal flow is caused by a through-hole forming part 80 of the mold 70 during casting. As such, a sprue cut surface 88D can be configured as one arcuate sprue fitted to the shape of a claw part 27. This sprue is designed so that a total length in the disk rotor circumferential direction is greater than a length in the disk rotor radial direction, as shown in FIG. 12. However, this method has a disadvantage in that it is necessary to cut machine the through-hole 50 after casting.

While the first to fifth embodiments have been described, the present invention is not limited to these embodiments, and may include various modifications as described below.

In each embodiment, the example in which the gravity casting is used has been described. However, the casting is not limited to the gravity casting. Any method of casting, such as low-pressure casting, to which concepts of the present invention can be applied may be used. In this case, the mold 70 should be manufactured by proper adjustment to the low-pressure casting. For example, when the casting is low-pressure casting, the sprues 82A, 82B and 82C should not be located on the upper side of the mold 70. Further, in this case, the bridge-part forming cavity part 72 is disposed so as to be located on the lower side in a gravitational direction, and the molten metal can gently run from the sprues 82A, 82B and 82C to the claw-part forming cavity part 71 and the bridge-part forming cavity part 72.

Further, in each embodiment, the sprues 82A, 82B and 82C are located substantially parallel to the cylinder-part forming cavity part 73 to thereby obtain a good flow of the molten metal, but the present invention is not limited to this configuration. The center lines of the sprues 82A, 82B and 82C may be inclined to some extent with respect to the axis of the cylinder-part forming cavity part 73.

Further, in each embodiment, the through-hole forming parts 80, 80A and 80B, i.e., the through-holes 50, 50A and 50B, are formed so that the upper side in the vertical direction is larger than the lower side in the vertical direction. However, the shapes of the through-holes 50, 50A and 50B are not limited to this shape. When the turbulent flow is little from the viewpoint of the molten metal flow due to sizes or installed positions of the through-holes 50, 50A and 50B, the through-holes 50, 50A and 50B may be formed so that the upper and lower sides in the vertical direction are equal to each other or that the lower side in the vertical direction is larger than the upper side in the vertical direction.

Further, in each embodiment, the riser storage parts 85, 85A and 85B are provided so as to be able to obtain a casting of good quality having small sink marks. However, when the sink marks hardly occur due to the flowability of the molten metal, a positional relationship between the sprues 82A, 82B and 82C, sizes and shapes of the through-holes 50, 50A and 50B, and so forth, the riser storage part 85 can be omitted.

Further, in each embodiment, the sprues 82A, 82B and 82C are disposed so as not to overlap with the through-hole forming parts 80, 80A and 80B, i.e., the through-holes 50, 50A and 50B, in a horizontal direction in the positional aspect. This is to take the molten metal flow into consideration. If a degree to which the molten metal flow is obstructed by the flowability of the molten metal, distances between the passages of the sprues 82A and 82B and the through-hole forming part 80, up-and-down directional superposition between the sprues 82A, 82B and 82C and the through-hole forming parts 80, 80A and 80B, and so on are within an allowable range in view of the quality of castings, the sprues 82A, 82B and 82C and the through-hole forming parts 80, 80A and 80B may be superposed on each other in the horizontal direction in the position aspect.

According to one or more of the above-mentioned embodiments and modifications, in the method of manufacturing a caliper body of a floating-type disk brake having the cylinder part having the cylinder bore into which the piston pressing the brake pads against the disk rotor is disposed, the bridge part extending from the cylinder part and including the through-hole, and the claw part formed on the side of the leading end of the bridge part and disposed so as to be opposite to the cylinder part, the mold is prepared in which the sprues are provided for at least two places spaced apart from each other in the disk rotor circumferential direction on the region corresponding to the claw part, and the molten metal is poured from the at least two sprues of the mold and starts to solidify from the side of the cylinder part. Thus, the bottom part of the cylinder part can be formed distant from the sprues, so that it is possible to improve the manufacturing efficiency of the caliper body.

According to one or more of the abovementioned embodiments and modifications, after the molten metal is poured from the at least two sprues, the mold is disposed so that the region corresponding to the cylinder part is located at a lower side in the vertical direction and the region corresponding to the claw part is located at an upper side in the vertical direction. For this reason, it is possible to preferably charge the molten metal into the region forming the cylinder part by gravity.

According to one or more of the abovementioned embodiments and modifications, since the at least two sprues can be formed at the positions where do not interfere with the through-hole in the disk rotor axial direction, the mold can prevent the turbulent flow of the molten metal poured from the at least two sprues.

According to one or more of the abovementioned embodiments and modifications, since the riser storage part is formed at the upper portion of the region forming the through-hole in the disk rotor axial direction between the at least two sprues of the region corresponding to the claw part, the mold can favorably supplement the molten metal from the riser storage part toward both sides.

According to one or more of the abovementioned embodiments and modifications, the mold is configured so that the regions forming the through-hole are formed on the region corresponding to the bridge part at two places spaced apart from each other in the disk rotor circumferential direction, that the sprues are provided at three opposite and middle places spaced apart from one another in the disk rotor circumferential direction on the region corresponding to the claw part, and that the riser storage parts are formed at two places corresponding to the regions forming the through-hole in the direction along the axis of the cylinder part between the three sprues respectively. For this reason, both the bridge part where the through-holes are formed at the two places and the claw part can be cast so as to be long in the disk rotor circumferential direction.

According to one or more of the abovementioned embodiments and modifications, the mold has the through-hole forming part forming the through-hole of the bridge part, and the through-hole forming part is formed so that the length of the disk rotor circumferential direction on the side of the region corresponding to the claw part is greater than the length of the disk rotor circumferential direction on the side of the region corresponding to the cylinder part. For this reason, it is possible to still further suppress the turbulent flow of the molten metal poured from the at least two sprues.

Further, according to the third embodiment and its related modifications, the cylinder part is cast so that the opening is formed in the bottom part thereof, and the opening is closed by the cover member after casting. For this reason, the side of the bottom part of the cylinder part where the molten metal flow is reduced can be separated to be distant from the sprues by forming the opening, so that it is possible to improve the manufacturing efficiency of the caliper body.

According to one or more of the abovementioned embodiments and modifications, in the caliper body of a floating-type disk brake which includes the cylinder part having the cylinder bore into which the piston pressing the brake pads against the disk rotor is disposed, the bridge part extending from the cylinder part and having the through-hole, and the claw part formed on the side of the leading end of the bridge part and disposed so as to be opposite to the cylinder part, the cylinder part, the bridge part, and the claw part are integrally cast, and the sprue cut surfaces are located in at least two places of the end face in the disk rotor axial direction on both sides in the disk rotor circumferential direction of the claw part. Thus, since the sprues are at the side of the claw part, and the side of the bottom part of the cylinder part can be separated to be distant from the sprues, it is possible to improve the manufacturing efficiency of the caliper body.

According to one or more of the abovementioned embodiments and modifications, the claw part is formed with the riser cut surface at the position between the at least two sprue cut surfaces and corresponding to the through-hole in the disk rotor axial direction. For this reason, it is possible to favorably supplement the molten metal from the riser storage part toward both sides.

According to one or more of the abovementioned embodiments and modifications, the through-holes are formed on the bridge part at two places spaced apart from each other in the disk rotor circumferential direction, the sprue cut surfaces are located at three opposite and middle places spaced apart from one another in the disk rotor circumferential direction of the claw part, and the riser cut surfaces are formed at two places corresponding to the through-holes in the disk rotor axial direction between the three sprue cut surfaces respectively. For this reason, both the bridge part where the through-holes are formed at the two places and the claw part can be cast so as to be long in the disk rotor circumferential direction.

According to one or more of the abovementioned embodiments and modifications, since the through-hole is formed so that the length in the disk rotor circumferential direction on the side of the claw part is greater than the length in the disk rotor circumferential direction on the side of the cylinder part, it is possible to suppress the turbulent flow of the molten metal.

According to one or more of the abovementioned embodiments and modifications, in the caliper body of a floating-type disk brake which includes the cylinder part having the cylinder bore into which the piston pressing the brake pads against the disk rotor is disposed, the bridge part extending from the cylinder part, and the claw part formed on the side of the leading end of the bridge part and disposed so as to be opposite to the cylinder part, the cylinder part, the bridge part, and the claw part are integrally cast, and the sprue cut surfaces are located on the end face of the disk rotor axial direction of the claw part. The sprue cut surface is configured so that the total length of the disk rotor circumferential direction is greater than the length of the disk rotor radial direction. Thus, since the sprues can be on the side of the claw part, and the bottom part of the cylinder part can be separated distant from the sprues, it is possible to improve the castability of the caliper body.

While the invention has been shown and described with reference to certain example embodiments thereof, it is not limited to these embodiments. It will be understood by those skilled in the art that various changes, additions, omissions, substitutions, and other modifications in configurations may be made therein without departing from the sprit or scope of the invention as defined by the appended claims. The invention is not limited by the foregoing description, and its scope is deemed to be limited by the appended claims only.

What is claimed is:

1. A method of manufacturing a caliper body of a floating-type disk brake, in which the caliper body comprises a cylinder part comprising a cylinder bore into which a piston pressing brake pads against a disk rotor is disposed, a bridge part extending from the cylinder part, and a claw part formed on a leading end side of the bridge part and disposed so as to be opposite to the cylinder part, the method comprising:

preparing a mold in which sprues are provided on a region configured to form the claw part; and pouring molten metal from the sprues of the mold, the molten metal starting to solidify from a side of the cylinder part, wherein the sprues are provided in at least two places spaced apart from each other in a disk rotor circumferential direction on a region configured to form the claw part, a through-hole is formed on the bridge part, and the mold is configured so that the sprues in the at least two places are formed at positions where they do not interfere with the through-hole in a disk rotor axial direction, and the mold comprises a riser storage part formed at a position configured to form the through-hole in a disk rotor axial direction between the sprues in the at least two places of the region configured to form the claw part.

2. The method according to claim 1, further comprising casting the cylinder part configured to be provided with an opening on a bottom part of the cylinder part.

3. The method according to claim 2, further comprising:
inserting a cutting tool from the opening after casting to machine the cylinder bore of the cylinder part; and
closing the opening using a cover member after the machining.

4. The method according to claim 3, wherein the cover member is bonded to the opening by friction stir welding.

5. The method according to claim 1, wherein, after the pouring of the molten metal is completed, the mold is disposed so that a region configured to form the cylinder part is located at a lower side in a vertical direction and a region configured to form the claw part is located at an upper side in the vertical direction.

6. The method according to claim 1, wherein the mold is configured so that a region forming the through-hole is formed at two places spaced apart from each other in the disk rotor circumferential direction on a region configured to form the bridge part, the sprues are provided at three opposite and middle places spaced apart from one another in the disk rotor circumferential direction on a region configured to form the claw part, and that two riser storage parts are formed at positions configured to form the through-hole in a direction along an axis of the cylinder part between the respective sprues of the three places.

7. The method according to claim 1, wherein the mold comprises the through-hole forming part where the through-hole of the bridge part is formed, and the through-hole forming part is formed so that a length in the disk rotor circumferential direction on the side of a region configured to form the claw part is greater than a length in the disk rotor circumferential direction on the side of a region configured to form the cylinder part.

* * * * *